United States Patent
Barrett

(10) Patent No.: US 9,758,971 B2
(45) Date of Patent: *Sep. 12, 2017

(54) THERMALLY ADAPTIVE WALL COVERING

(71) Applicant: Barrett Aerospace Technologies, LLC, Lawrence, KS (US)

(72) Inventor: Ronald Paul Barrett, Holden, MO (US)

(73) Assignee: Barrett Aerospace Technologies, LLC, Lawrence, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/474,350

(22) Filed: Mar. 30, 2017

(65) Prior Publication Data
US 2017/0218636 A1    Aug. 3, 2017

Related U.S. Application Data

(63) Continuation of application No. 15/013,739, filed on Feb. 2, 2016, now Pat. No. 9,677,284.

(51) Int. Cl.
| *E04F 13/072* | (2006.01) |
| *E04F 13/08* | (2006.01) |
| *B32B 9/00* | (2006.01) |
| *B32B 15/04* | (2006.01) |

(Continued)

(52) U.S. Cl.
CPC ............ *E04F 13/072* (2013.01); *B32B 7/12* (2013.01); *B32B 9/007* (2013.01); *B32B 15/04* (2013.01); *B32B 27/38* (2013.01); *E04F 13/0864* (2013.01); *E04F 13/0866* (2013.01); *E04F 13/0875* (2013.01); *B32B 2255/00* (2013.01); *B32B 2607/02* (2013.01)

(58) Field of Classification Search
CPC . E04F 13/072; E04F 13/0864; E04F 13/0875; E04F 13/0866; B23B 9/007; B23B 15/04; B23B 27/38; B23B 2607/02; B23B 2255/00

See application file for complete search history.

(56) References Cited

U.S. PATENT DOCUMENTS 2,125,363 A * 8/1938 Voegeli ..................... E04D 5/10
                                                                52/520
2,418,758 A * 4/1947 Cooper ............... E04F 13/0864
                                                                428/595

(Continued)

*Primary Examiner* — Brian Glessner
*Assistant Examiner* — Omar Hijaz
(74) *Attorney, Agent, or Firm* — Hovey Williams LLP

(57) ABSTRACT

A thermally adaptive wall covering is operable to cover at least part of a wall and to move in response to a change in covering temperature. The wall covering includes a laminated composite panel with first and second panel layers and an intermediate connecting structure that connects the panel layers relative to one another along an interface defined between the panel layers. The first and second panel layers have, respectively, first and second coefficients of thermal expansion that are different from each other and cause expansion and contraction of the corresponding panel layers along an interface therebetween. The connecting structure permits expansion and/or contraction of each panel layer relative to the other panel layer in response to the covering temperature change so that the panel flexes.

31 Claims, 33 Drawing Sheets

(51) Int. Cl.
  *B32B 27/38* (2006.01)
  *B32B 7/12* (2006.01)

(56) References Cited

U.S. PATENT DOCUMENTS

| | | | | |
|---|---|---|---|---|
| 3,218,772 | A * | 11/1965 | Martin | E04F 13/0803 52/508 |
| 3,552,078 | A * | 1/1971 | Mattes | E04F 13/0864 52/520 |
| 4,942,712 | A * | 7/1990 | Thompson | E04C 2/326 52/417 |
| 6,408,580 | B1 * | 6/2002 | Jurvis | E04F 13/0864 52/233 |
| 8,082,696 | B2 * | 12/2011 | Oliver | B32B 3/04 267/142 |
| 8,245,476 | B2 * | 8/2012 | Sergounine | E04F 13/0803 52/233 |
| 9,140,017 | B1 * | 9/2015 | Oliver | E04F 13/075 |
| 2003/0192282 | A1 * | 10/2003 | Bullinger | E04F 13/0864 52/539 |
| 2007/0011976 | A1 * | 1/2007 | Mowery | E04F 13/0864 52/506.01 |
| 2007/0144096 | A1 * | 6/2007 | O'Neal | E04F 13/0864 52/520 |
| 2009/0096325 | A1 * | 4/2009 | Barrett | H01L 41/0926 310/330 |
| 2009/0301015 | A1 * | 12/2009 | Simms | B44C 5/0415 52/313 |
| 2009/0320388 | A1 * | 12/2009 | Lilli | E04B 2/88 52/173.3 |
| 2010/0132289 | A1 * | 6/2010 | Mahaffey | E04F 13/0864 52/309.8 |
| 2010/0144266 | A1 * | 6/2010 | Lowe | F24F 7/02 454/365 |
| 2013/0097951 | A1 * | 4/2013 | Chism | E04H 7/065 52/309.1 |
| 2013/0111840 | A1 * | 5/2013 | Bordener | E04B 1/68 52/393 |
| 2015/0368913 | A1 * | 12/2015 | Hatch | E04F 19/02 52/716.8 |

* cited by examiner

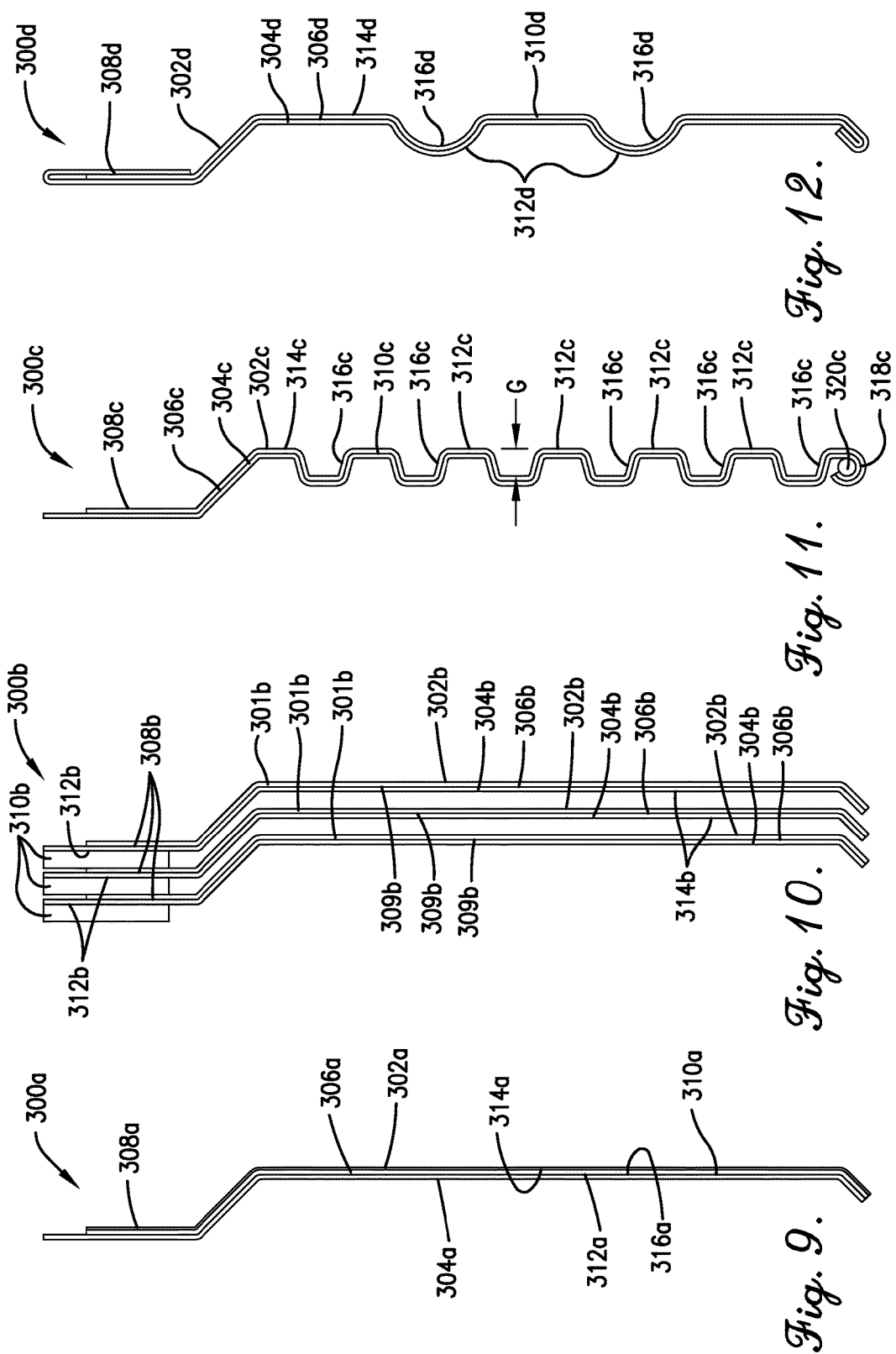

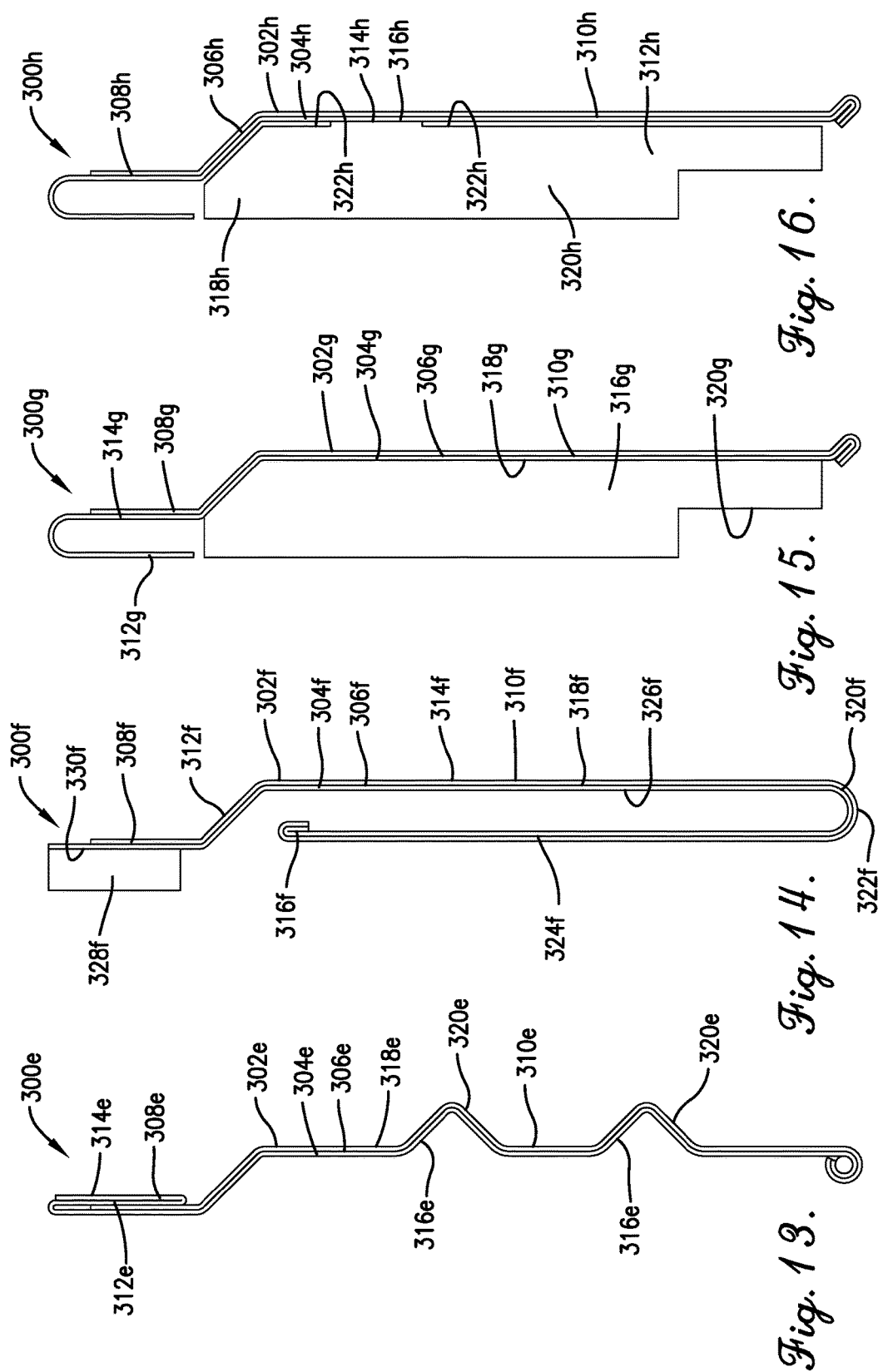

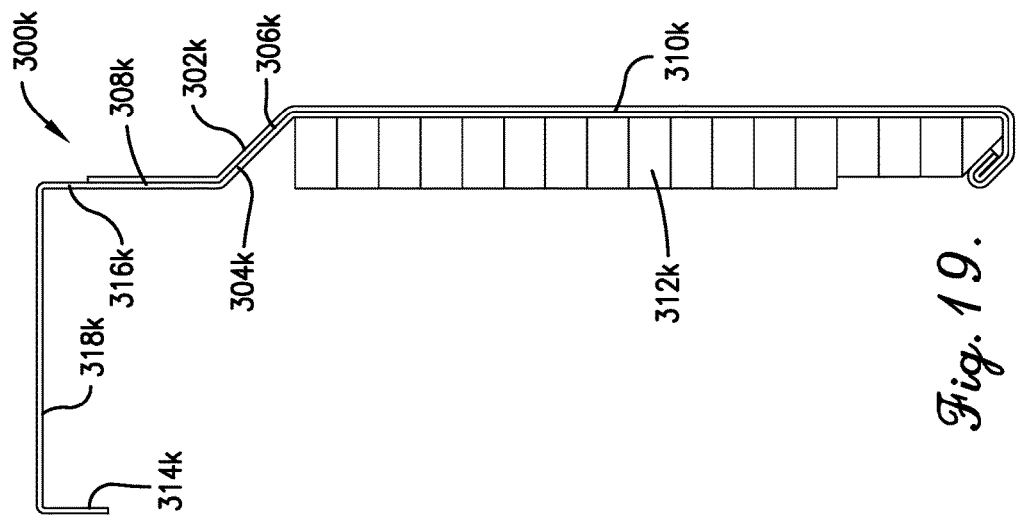
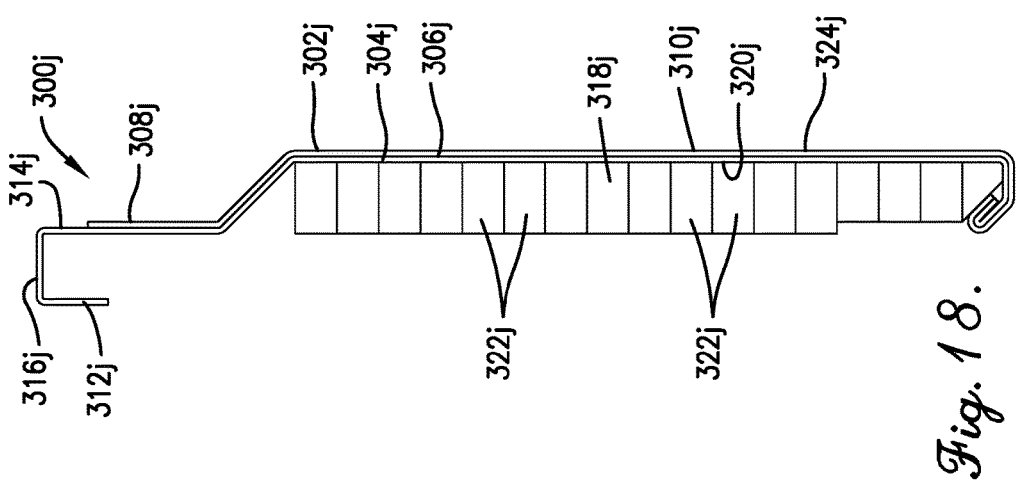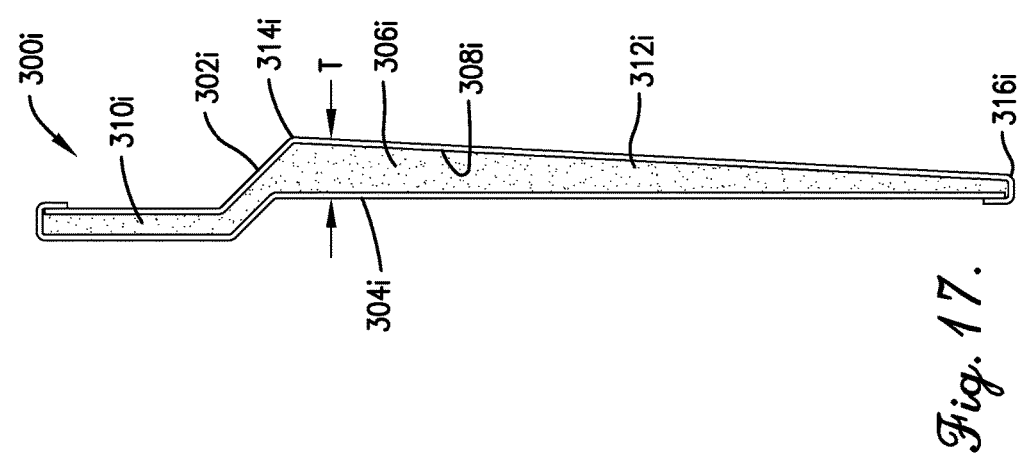

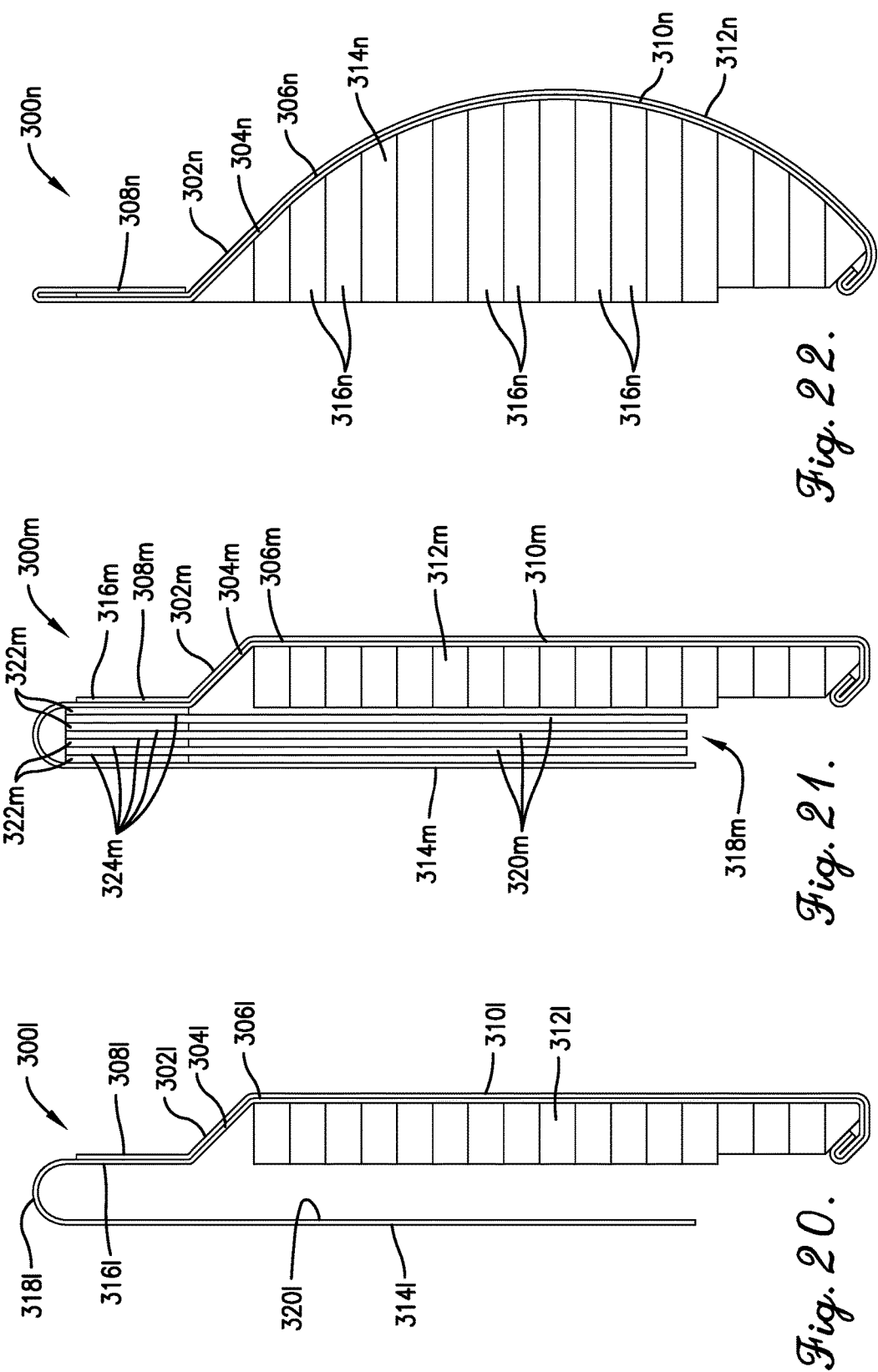

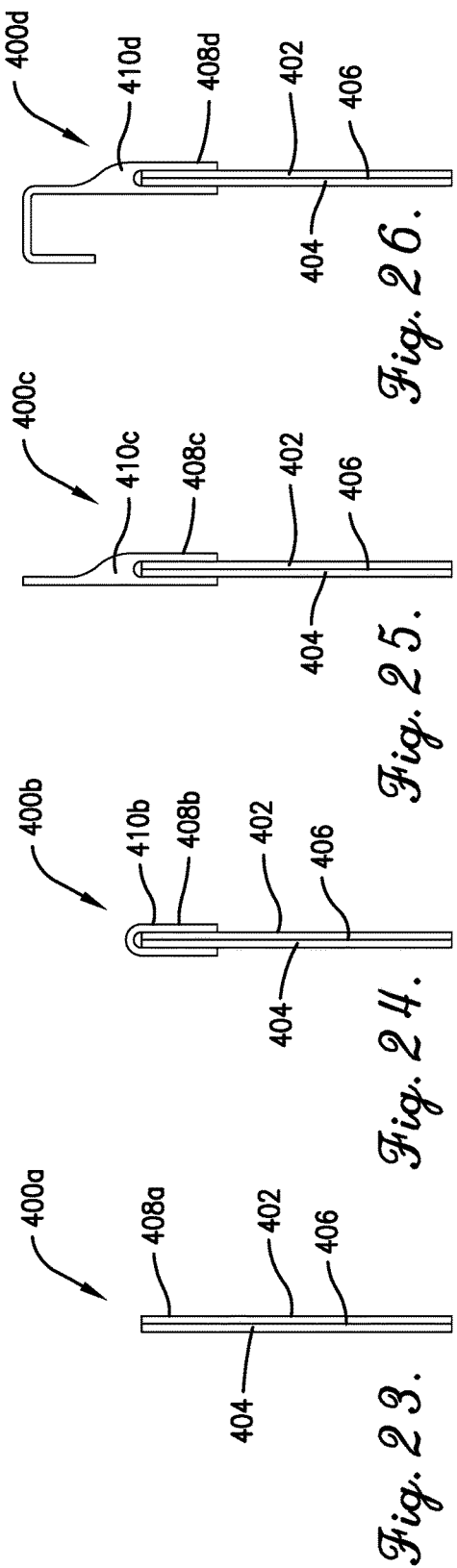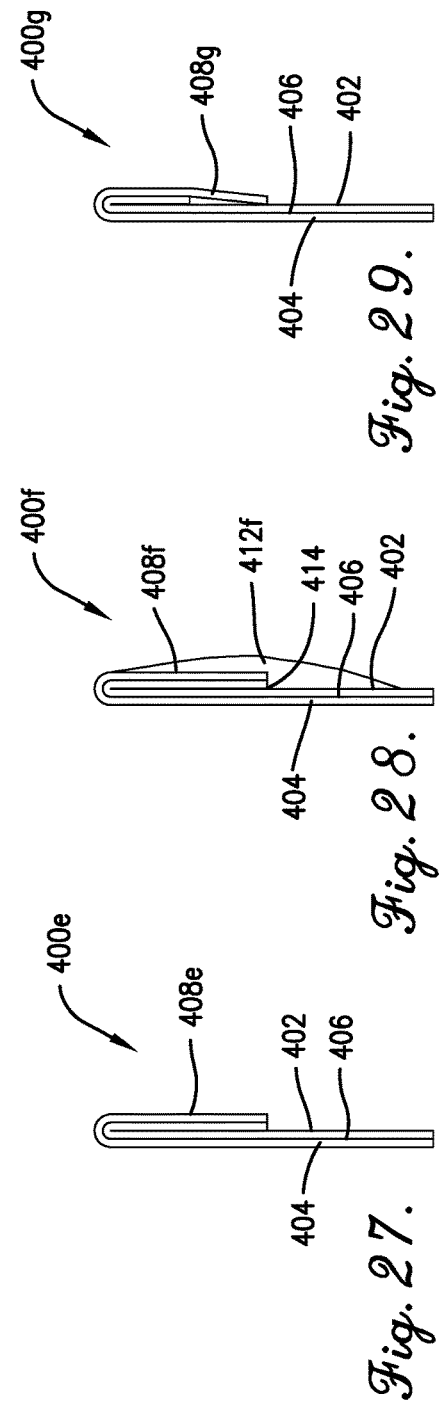

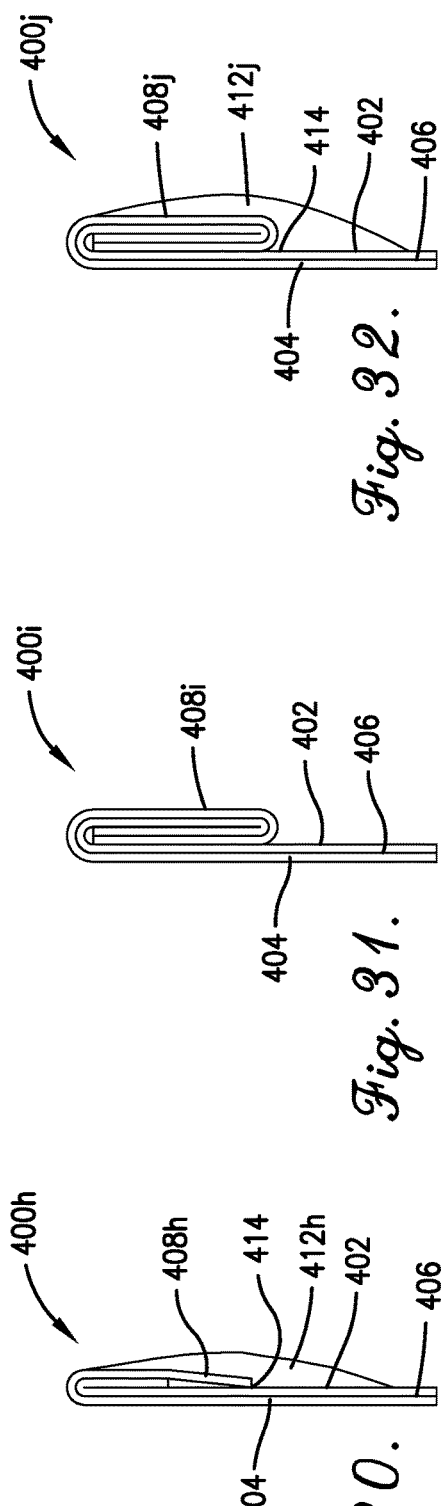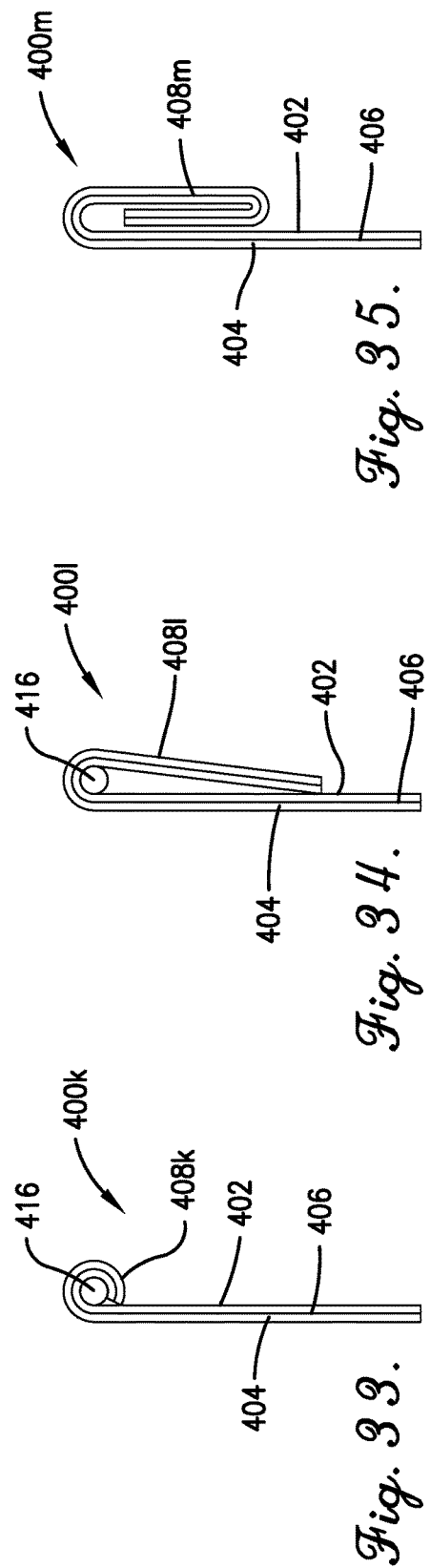

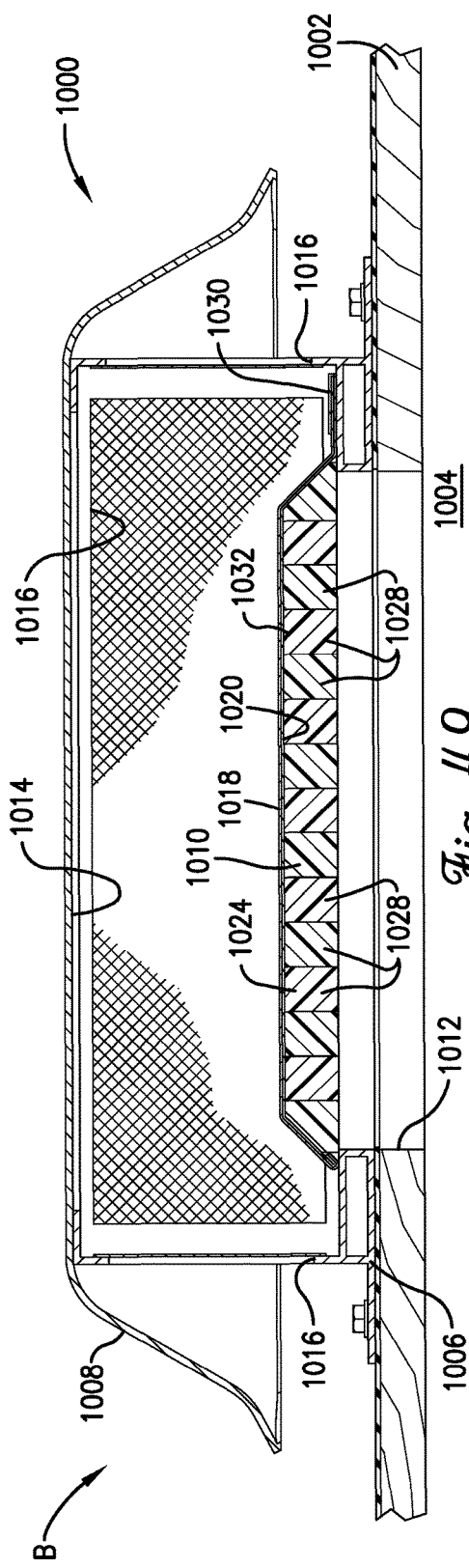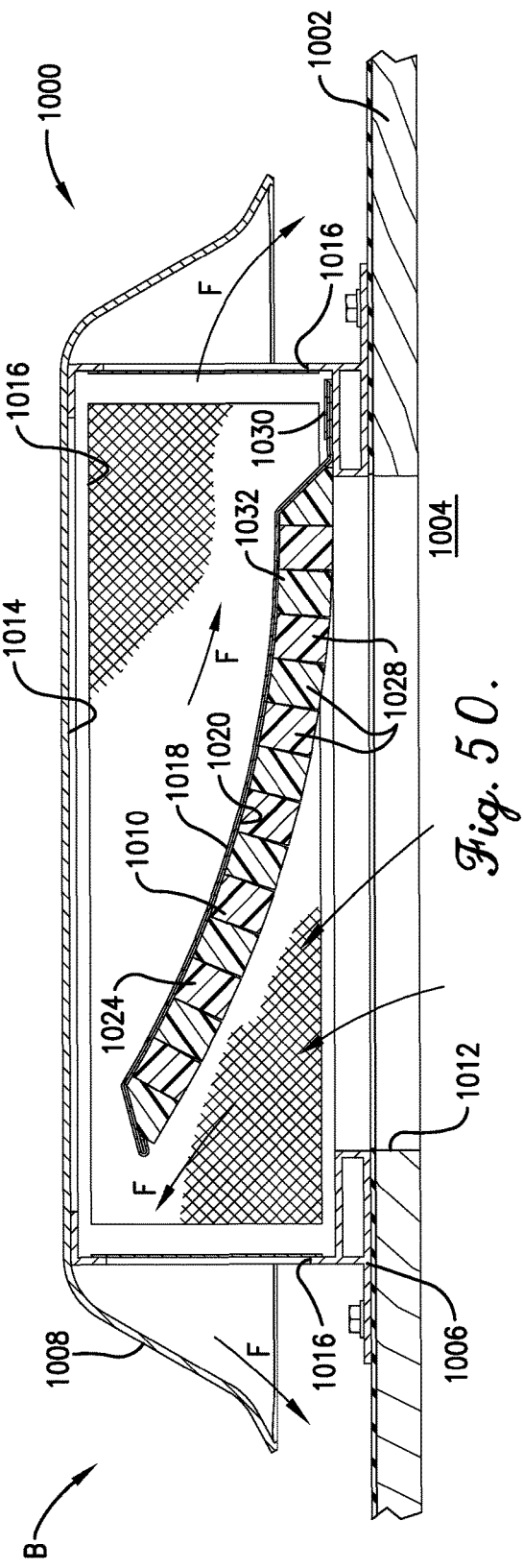

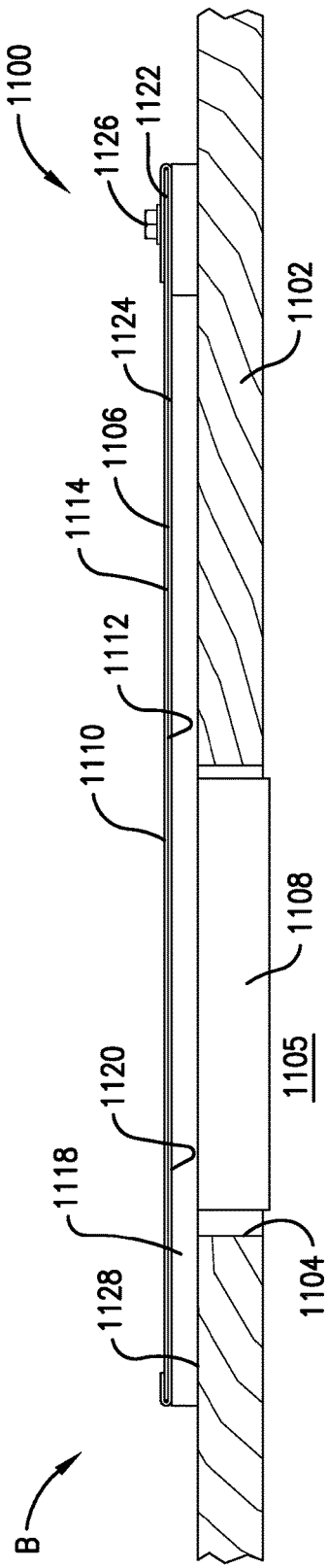
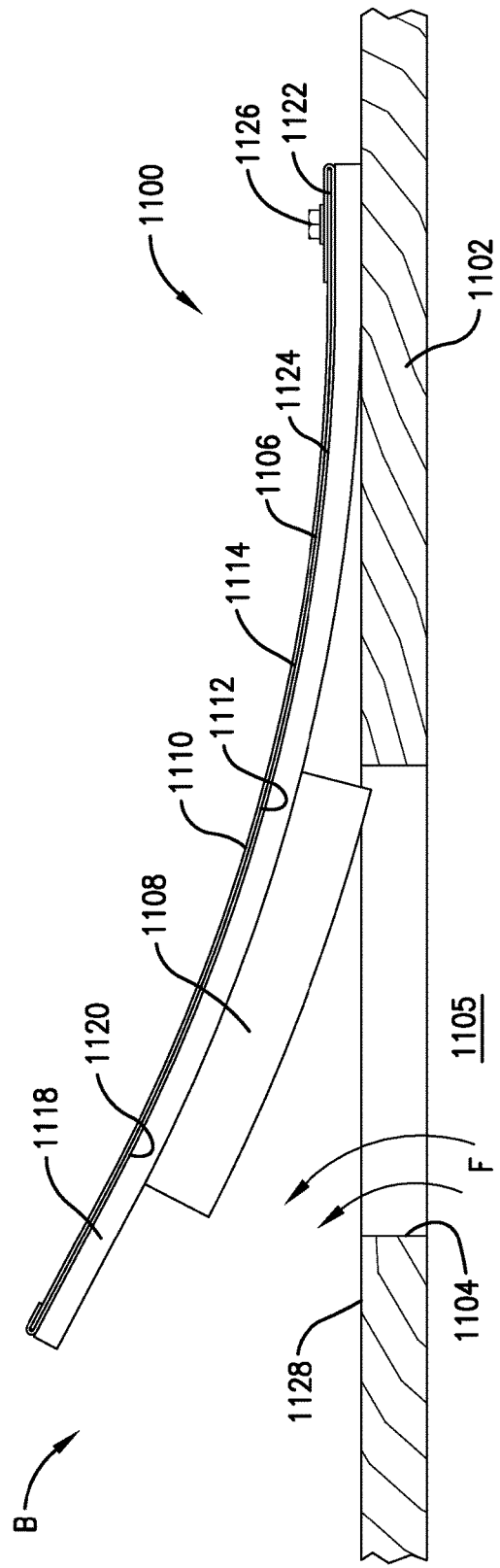
Fig. 53.
Fig. 54.

THERMALLY ADAPTIVE WALL COVERING

CROSS REFERENCE TO RELATED APPLICATION

This is a continuation of prior application Ser. No. 15/013,739, filed Feb. 2, 2016, entitled THERMALLY ADAPTIVE WALL COVERING, which is hereby incorporated in its entirety by reference herein.

BACKGROUND

1. Field

The present invention relates generally to various types of buildings and building materials associated with buildings. More specifically, embodiments of the present invention concern a laminated composite panel used to provide a thermally adaptive structure for a building.

2. Discussion of Prior Art

Prior art residential and commercial buildings have used a wide array of exterior coverings to protect the structure from being damaged or otherwise degraded by exposure to ambient weather conditions. For instance, various types of conventional exterior siding serve to prevent ambient air and water from entering the interior of the building. Prior art exterior siding also provides limited thermal insulation for the building interior (e.g., when ambient temperatures are extremely hot or extremely cold).

Conventional buildings also commonly include an exterior venting structure that can permit gases to selectively flow into and out of the building. For instance, prior art residential homes typically include one or more ridge vents, roof vents, and/or gable vents that serve to vent the attic space of the home. Prior art vents include manually adjusted vents, spring-loaded vents responsive to venting gas flow, and electronically controlled vents.

However, prior art building coverings have numerous deficiencies. For instance, the amount of thermal insulation provided solely by conventional exterior siding generally amounts to a small fraction of the thermal insulation provided by the entire wall of the building. For instance, to provide a comfortable living and/or working environment in a building, conventional building walls often include stud walls and insulating material installed within the stud walls.

Prior art building vents also have various deficiencies. For example, manual vents and spring-loaded vents are inexpensive but generally do not respond or adjust according to a change in ambient conditions. Electronic vents are cost prohibitive to use in many building applications and are prone to malfunction due to environmental exposure.

SUMMARY

The following brief summary is provided to indicate the nature of the subject matter disclosed herein. While certain aspects of the present invention are described below, the summary is not intended to limit the scope of the present invention.

Embodiments of the present invention provide a thermally adaptive wall covering and thermally adaptive enclosure vent that does not suffer from the problems and limitations of the prior art coverings and vents set forth above.

A first aspect of the present invention concerns a thermally adaptive wall covering operable to cover at least part of a wall and to move in response to a change in covering temperature. The wall covering broadly includes a laminated composite panel. The panel includes first and second panel layers and an intermediate connecting structure that connects the panel layers relative to one another along an interface defined between the panel layers. The panel defines an elongated attachment region along which the panel is configured to be attached to the wall. One of the panel layers generally overlies the other one of the panel layers when the attachment region is attached to the wall, with the other panel layer configured to generally face the wall. The first and second panel layers have, respectively, first and second coefficients of thermal expansion that are different from each other and cause expansion and contraction of the corresponding panel layers along the interface. The connecting structure permits expansion and/or contraction of each panel layer relative to the other panel layer in response to the covering temperature change so that the panel flexes.

A second aspect of the present invention concerns a building that broadly includes a wall and an exterior thermally adaptive wall covering. The wall covering covers at least part of the wall and moves in response to a change in covering temperature. The wall covering broadly includes laminated composite panels. The panels each include outer and inner panel layers and an intermediate connecting structure that connects the panel layers relative to one another along an interface defined between the panel layers, with the inner panel layer engaging the wall. The panel defines an elongated attachment region attached to the wall. The outer panel layer generally overlies the inner panel layer, with the inner panel layer generally facing the wall. The outer and inner panel layers have, respectively, first and second coefficients of thermal expansion that are different from each other and cause expansion and contraction of the corresponding panel layers along the interface. The connecting structure permits expansion and/or contraction of each panel layer relative to the other panel layer in response to the covering temperature change so that each panel flexes.

A third aspect of the present invention concerns a method of adjustably insulating a building that includes a wall, a first panel, and a second panel overlapping the first panel, with the panels being shiftably attached to the wall to at least partly cover the wall. The method broadly includes the step of having the second panel flex between an unsealed condition, where the second panel is spaced from the first panel, and a sealed condition, where the second panel engages the first panel to enclose an air space between the panels and the wall.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein:

FIG. 1 is a perspective of an enclosed building with an enclosure wall and a wall covering constructed in accordance with a first preferred embodiment of the present invention, with the wall covering including laminated composite panels in overlapping arrangement with one another;

FIG. 2a is a cross section of the building shown in FIG. 1, showing the panels mounted on the wall so that adjacent pairs of upper and lower panels overlap one another, with the panels being flexed into a sealed condition in response to a covering temperature below a normal operating temperature of the panels, where each of the upper panels is in sealing engagement with a corresponding lower panel;

Figure 1:
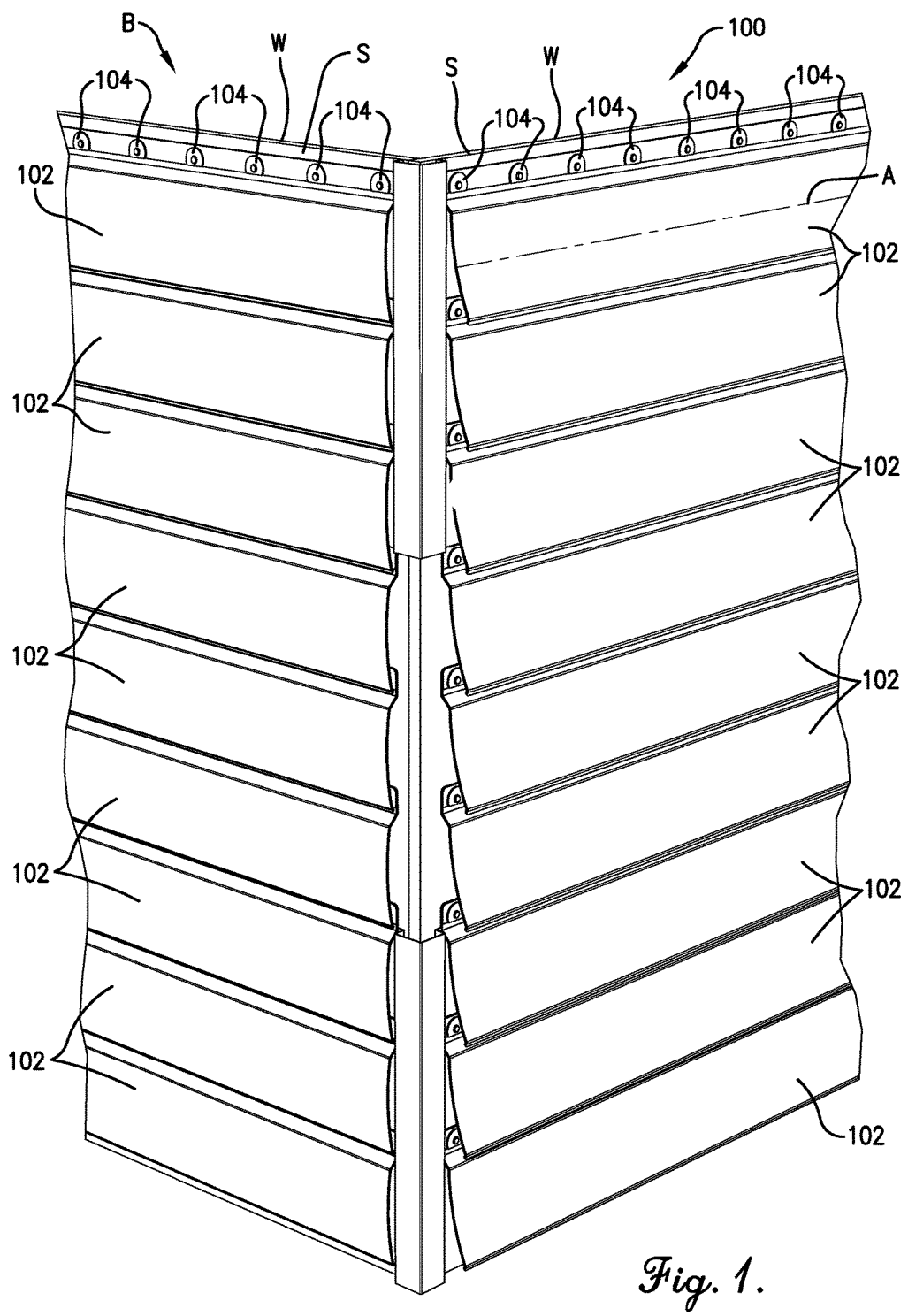
Figure 2A:
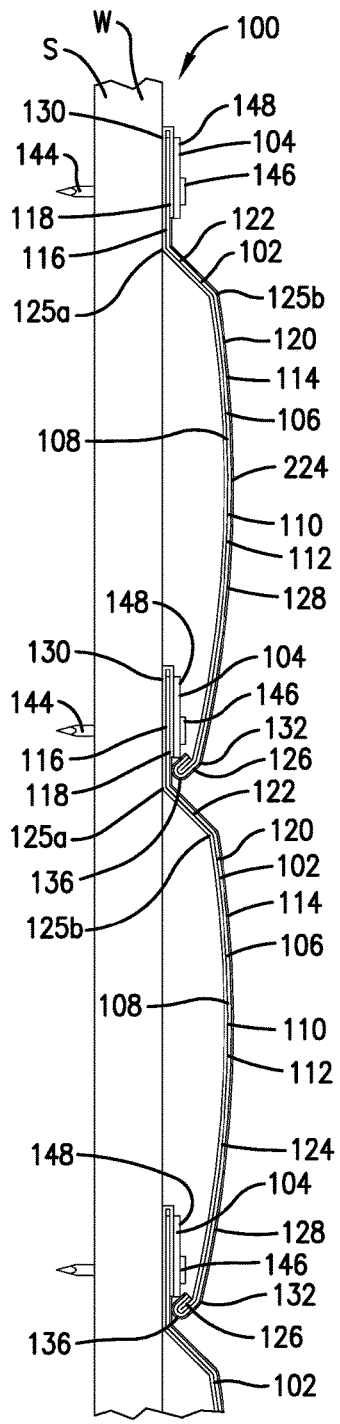
FIG. 2b is a cross section of the building similar to FIG. 2a, but showing the panels flexed out of the sealed condition to an unsealed condition in response to the covering temperature of the panels rising to the normal operating temperature, with an exposed surface of the panels being generally planar.
FIG. 2c is a cross section of the building similar to FIG. 2b, but showing the panels flexed to another unsealed condition in response to the covering temperature rising to a temperature above the normal operating temperature, with the exposed surface of the panels being generally concave.
Figure 2B:
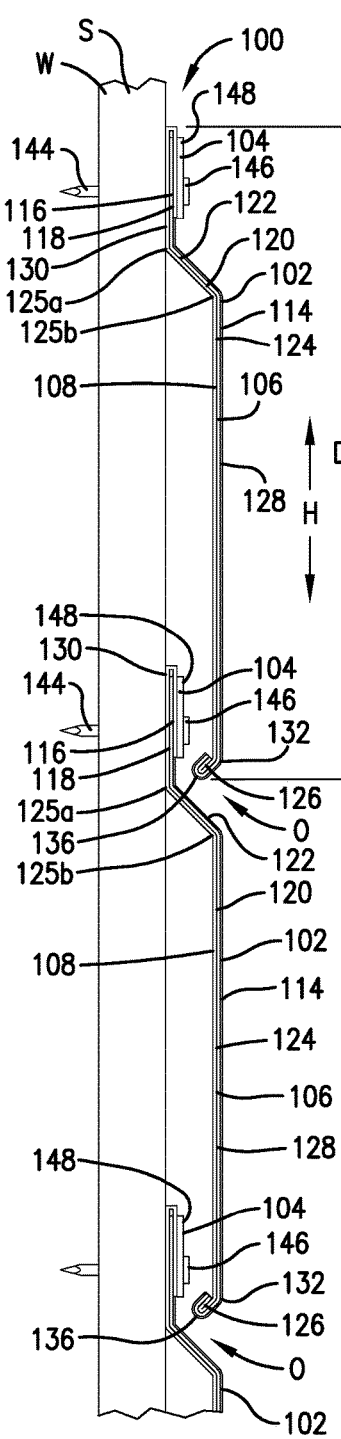
Figure 2C:
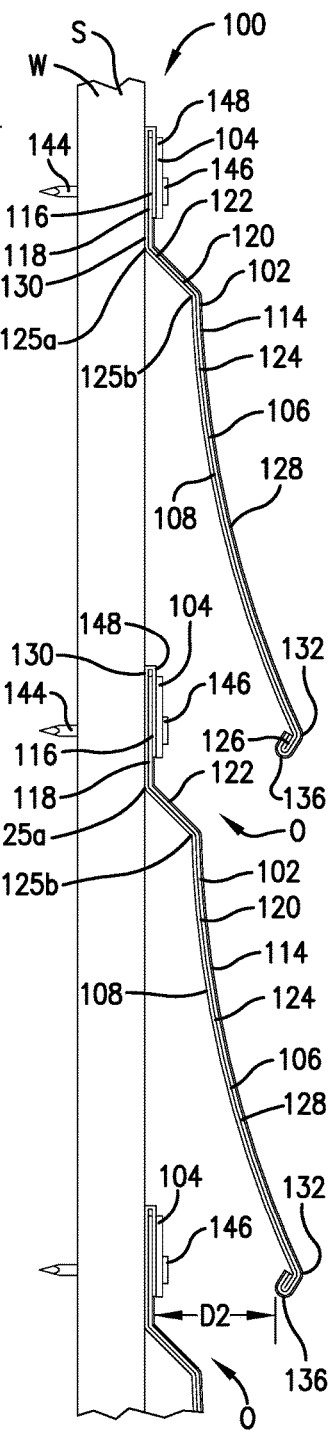
Figures 3A, 3B, 3C:
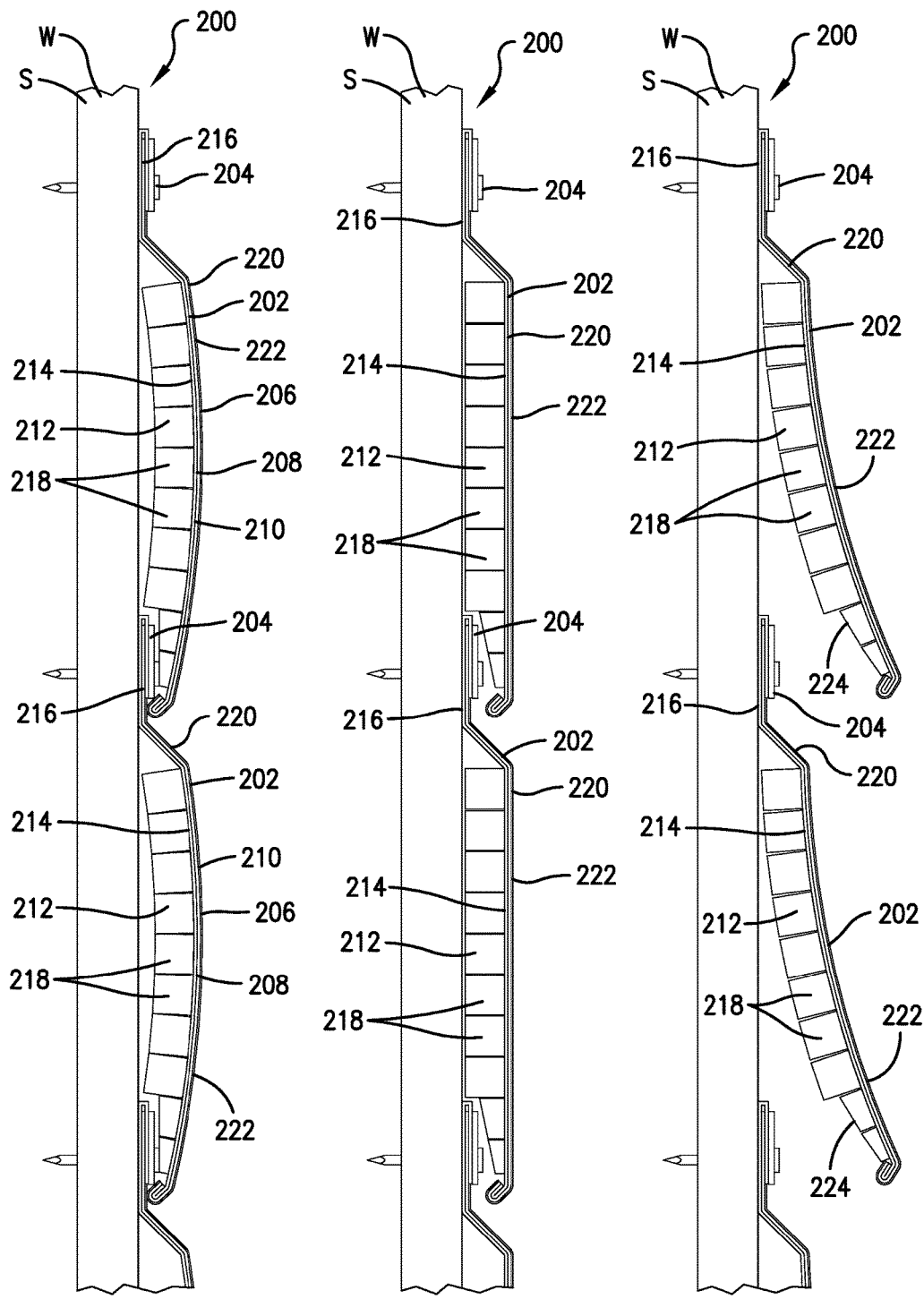
Figure 4:
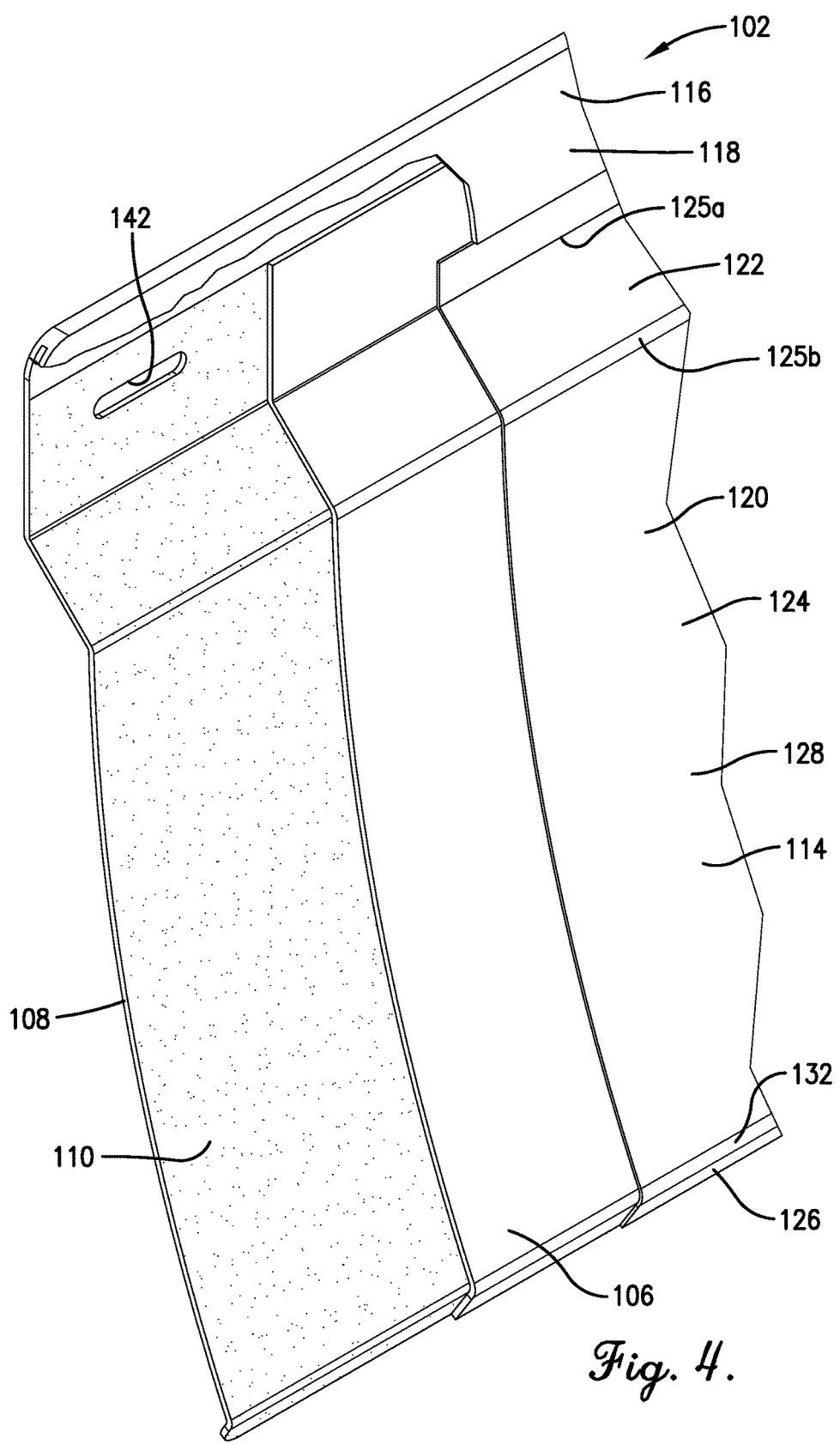
Figure 5:
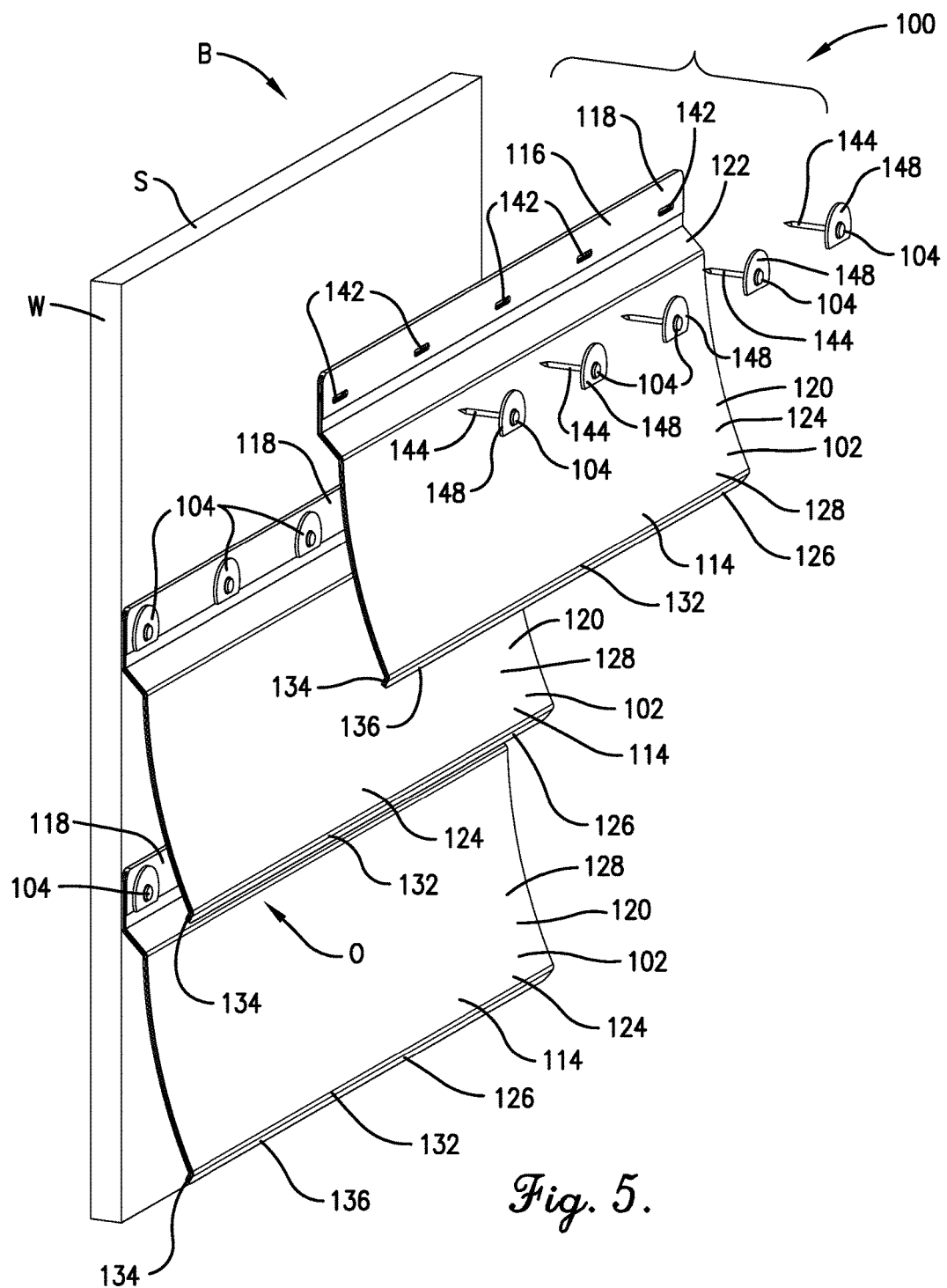
Figure 5A:
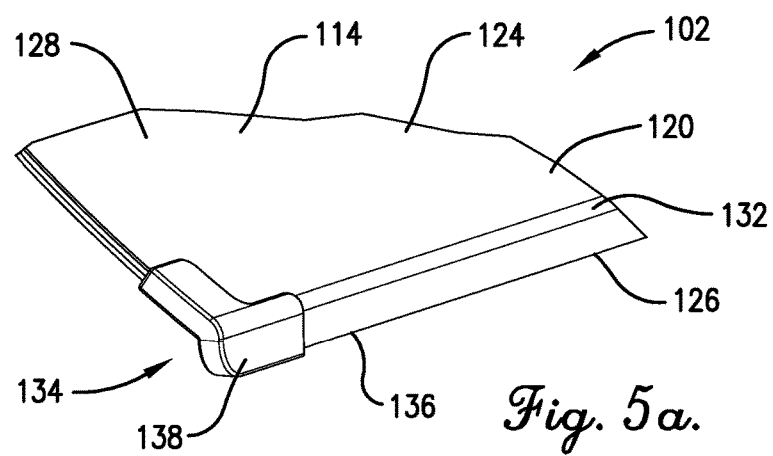
Figure 5B:
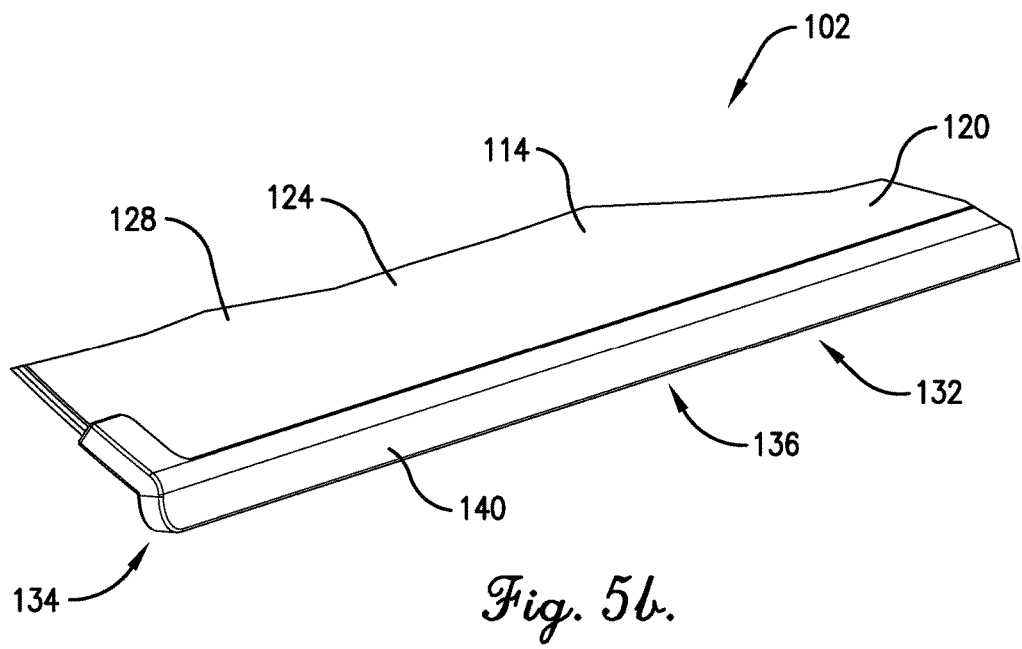
Figure 6:
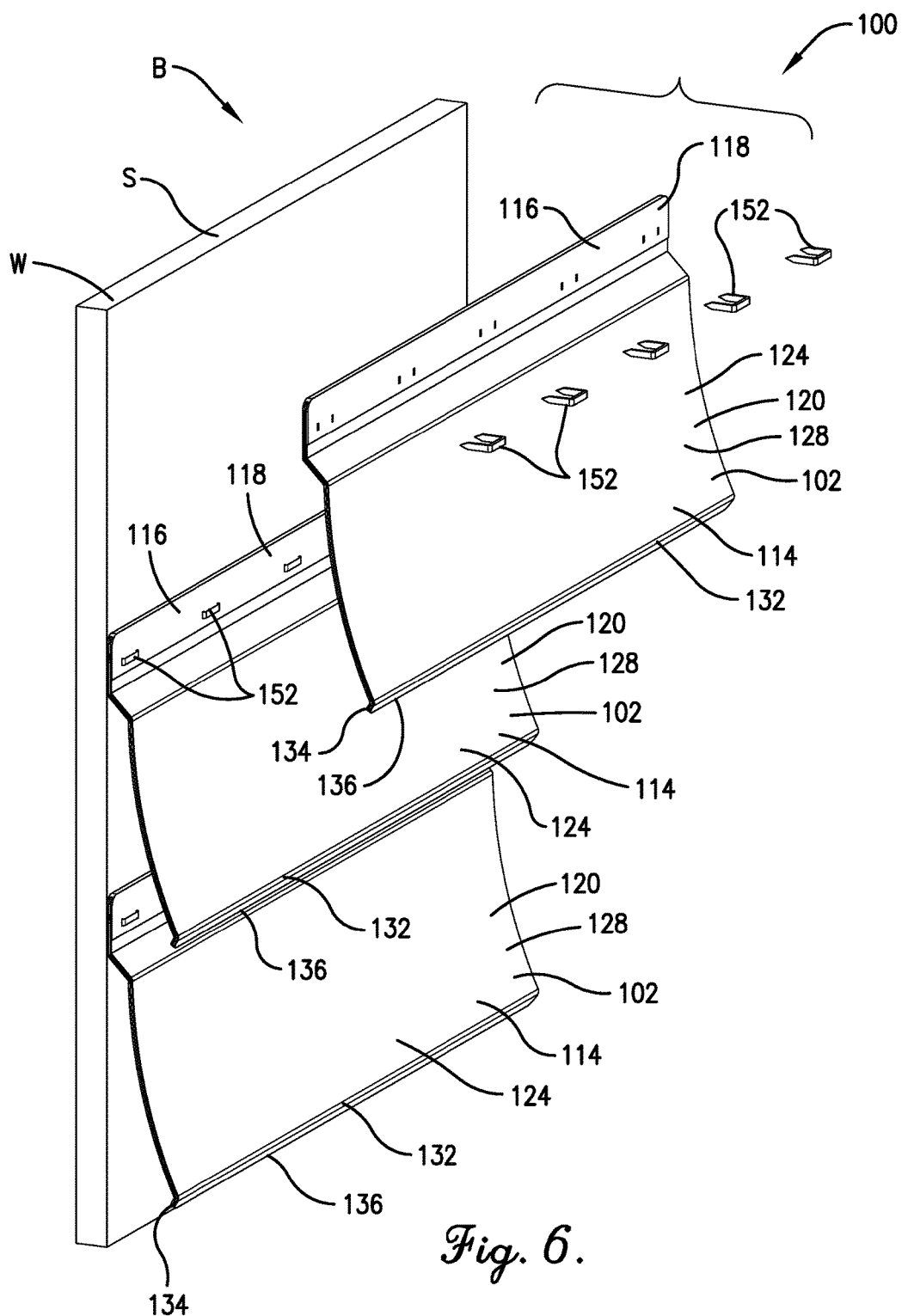
Figure 7:
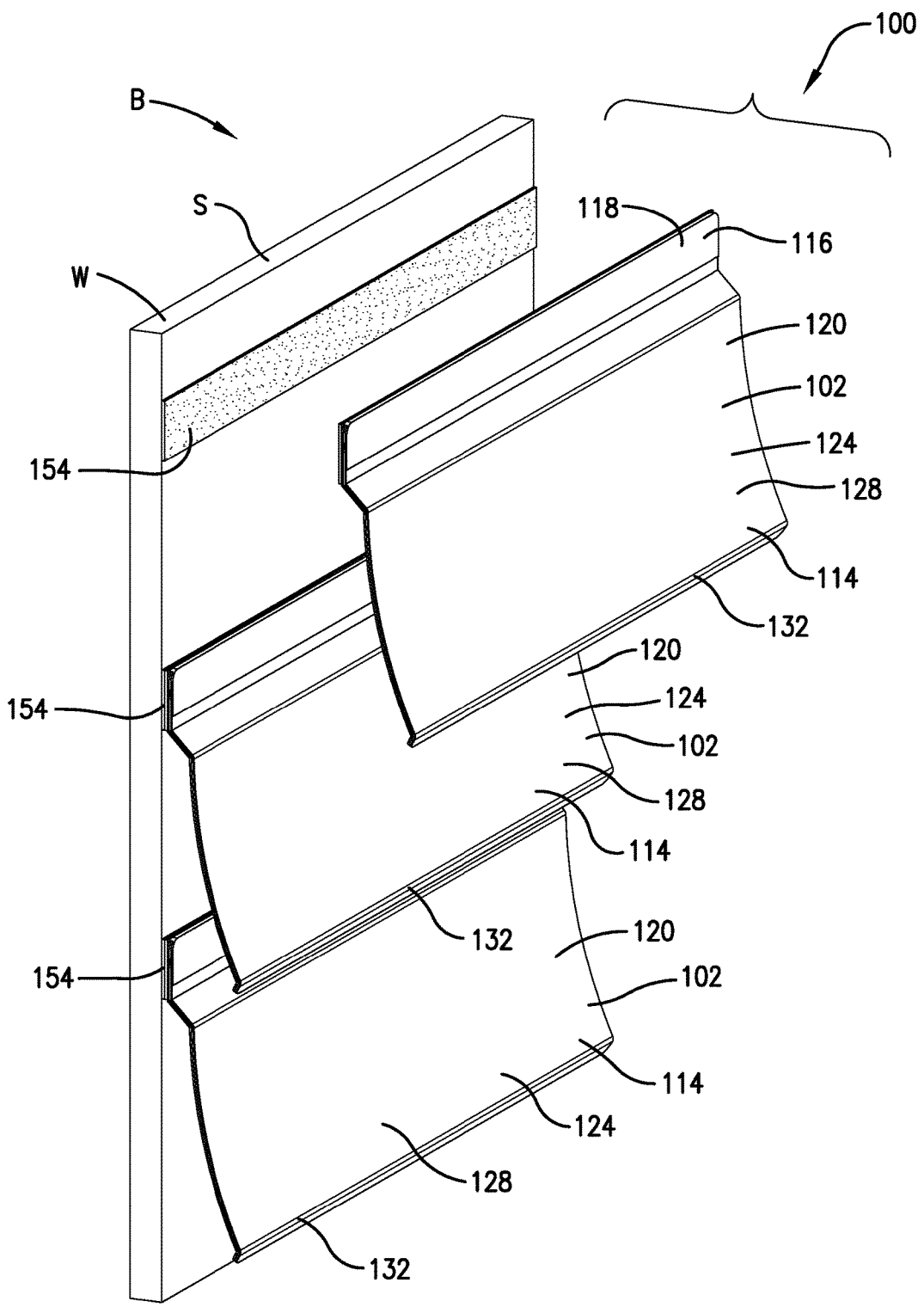
Figure 7A:
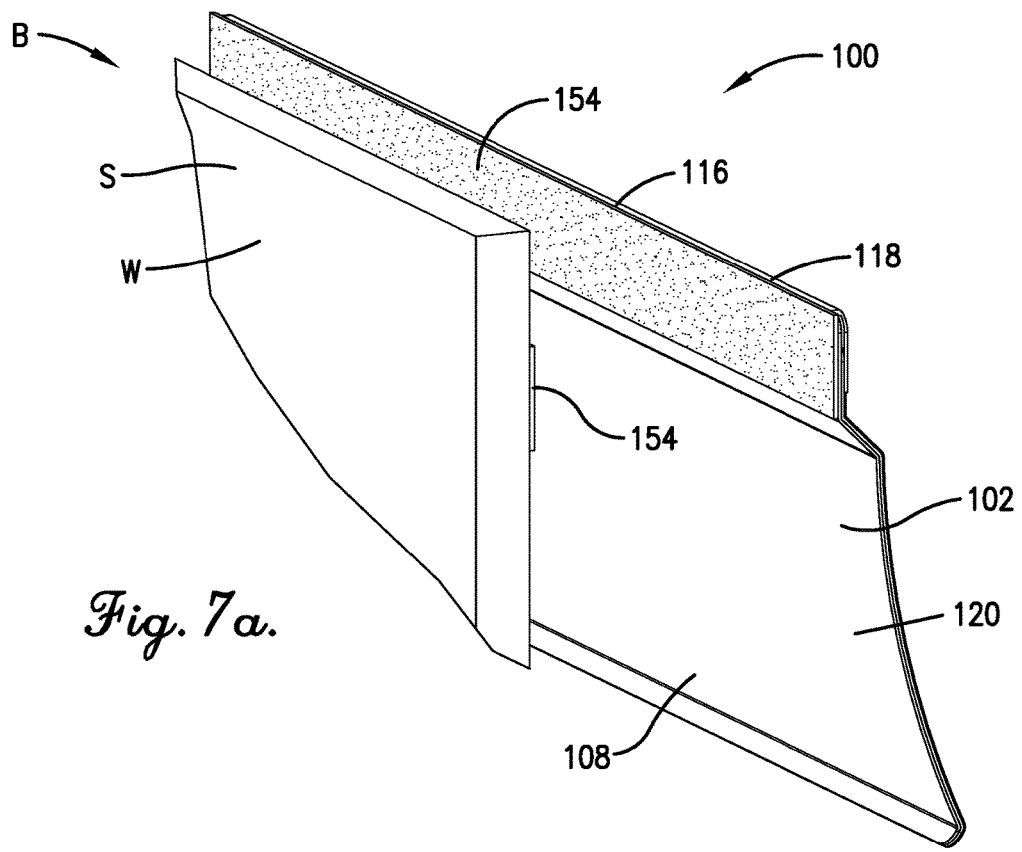
Figure 8:
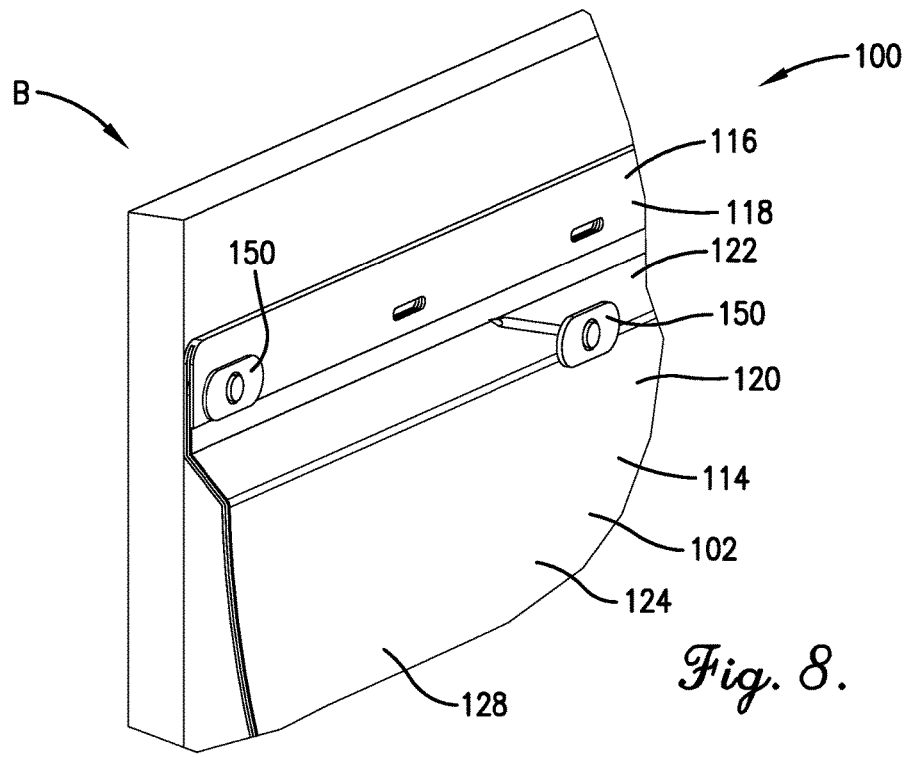
Figure 36:
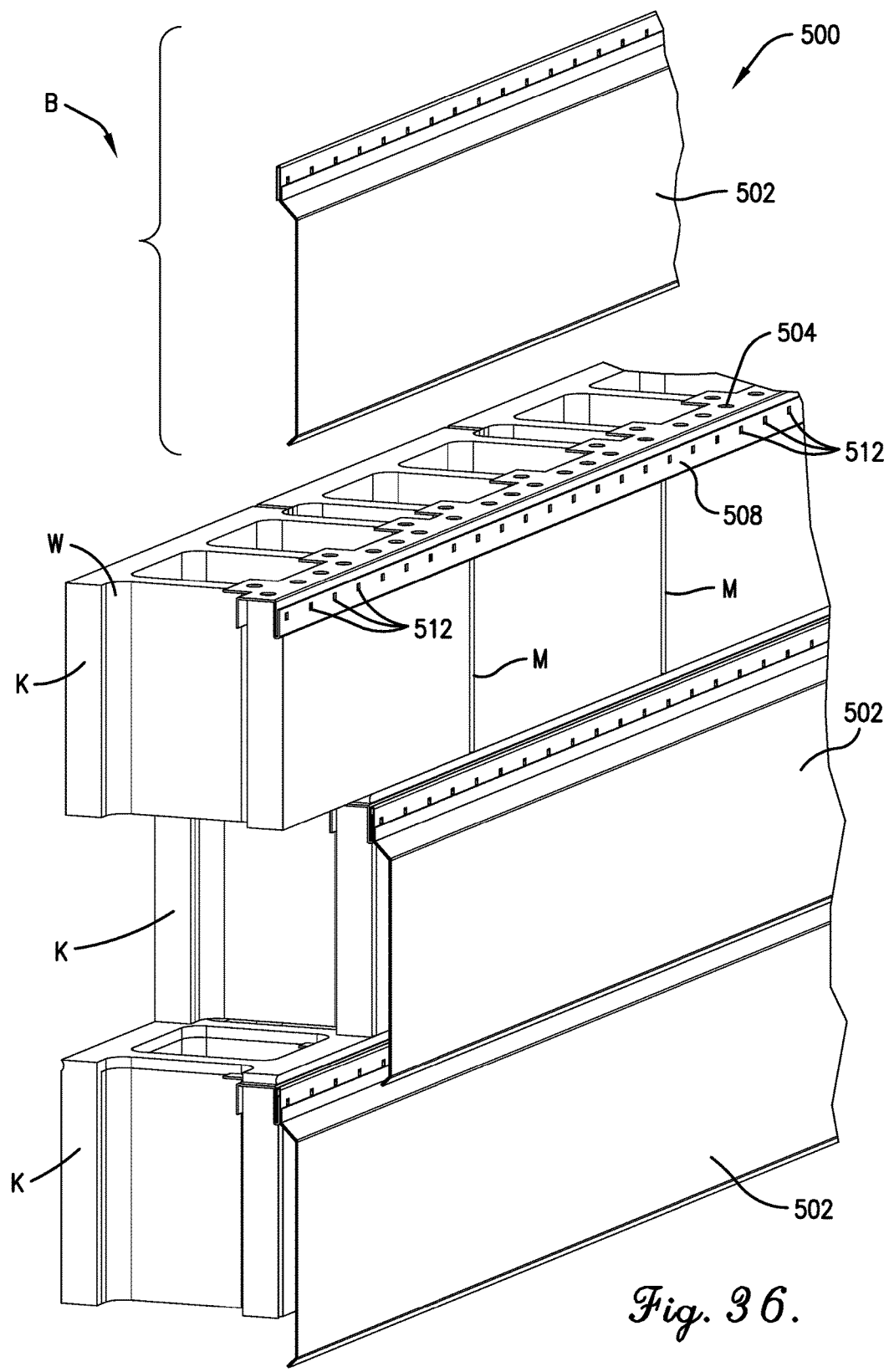
Figure 37:
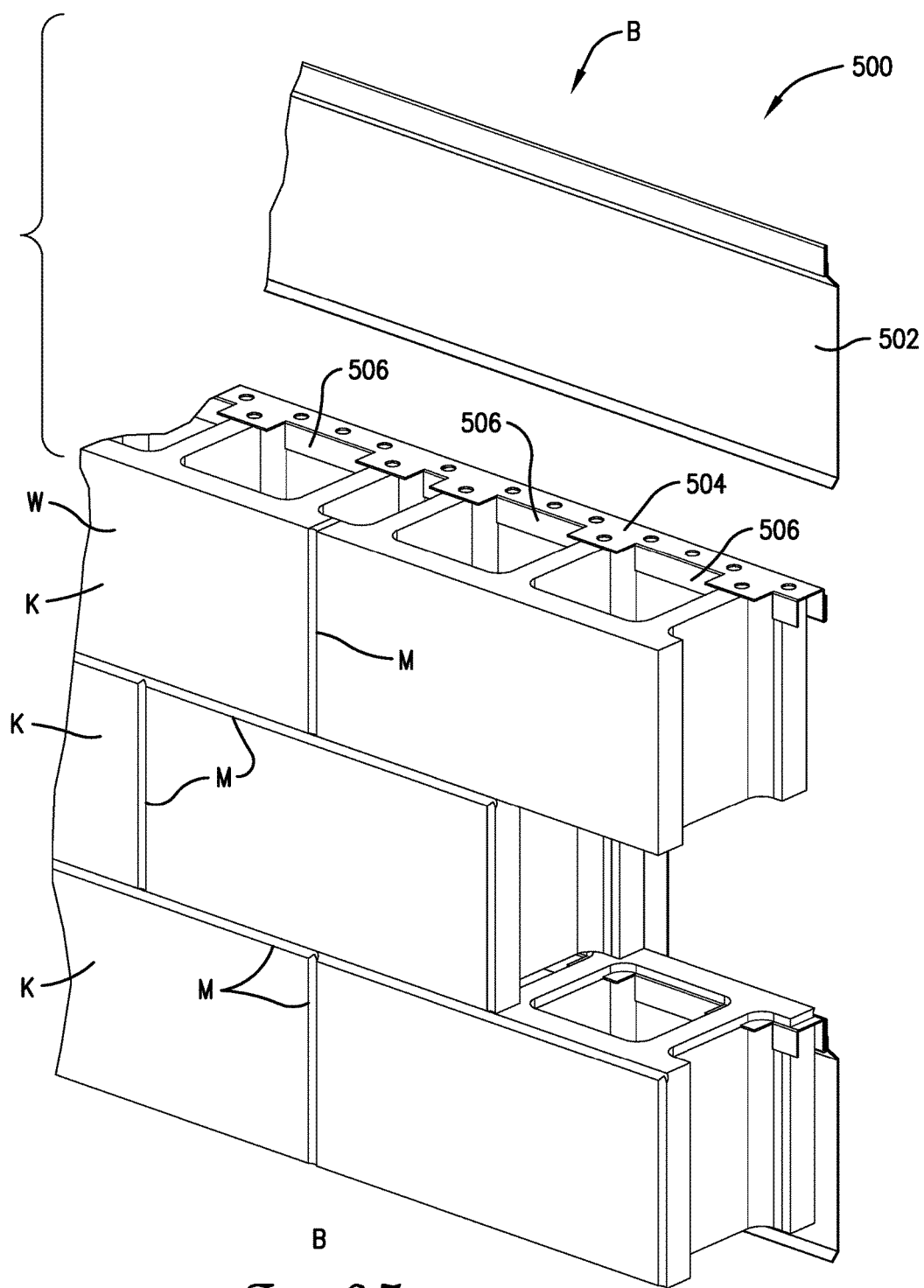
Figure 38:
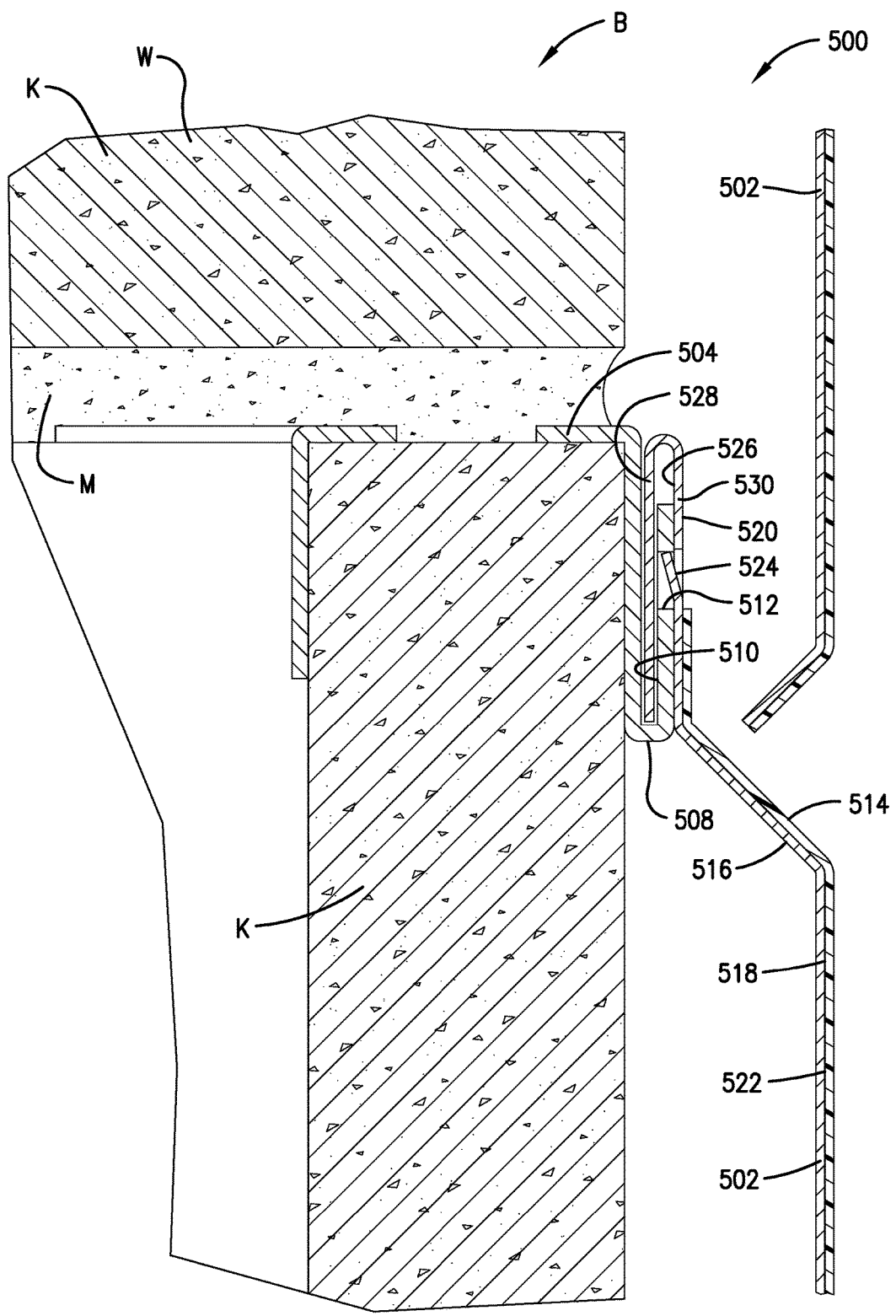
Figure 39:
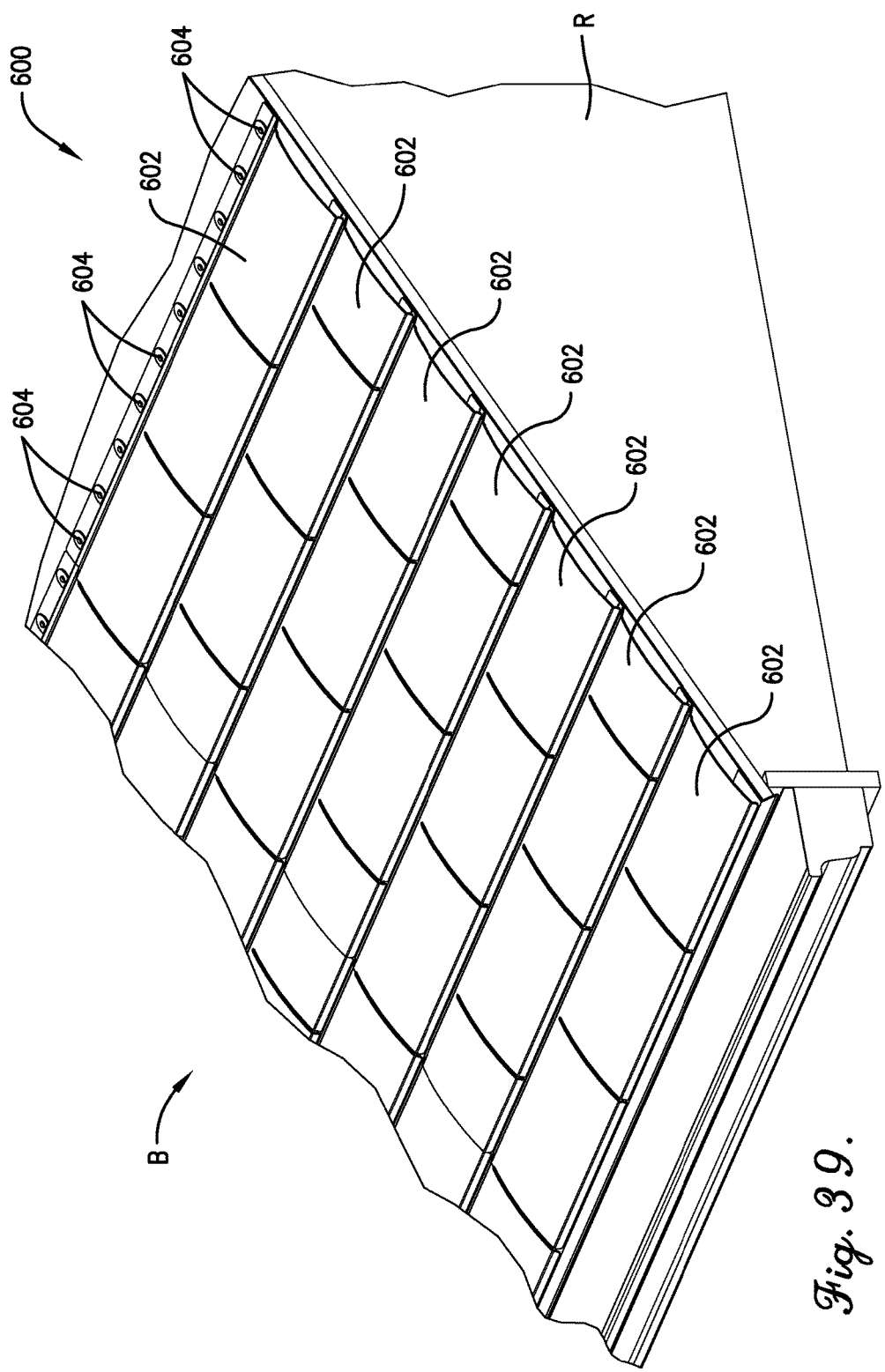
Figure 40:
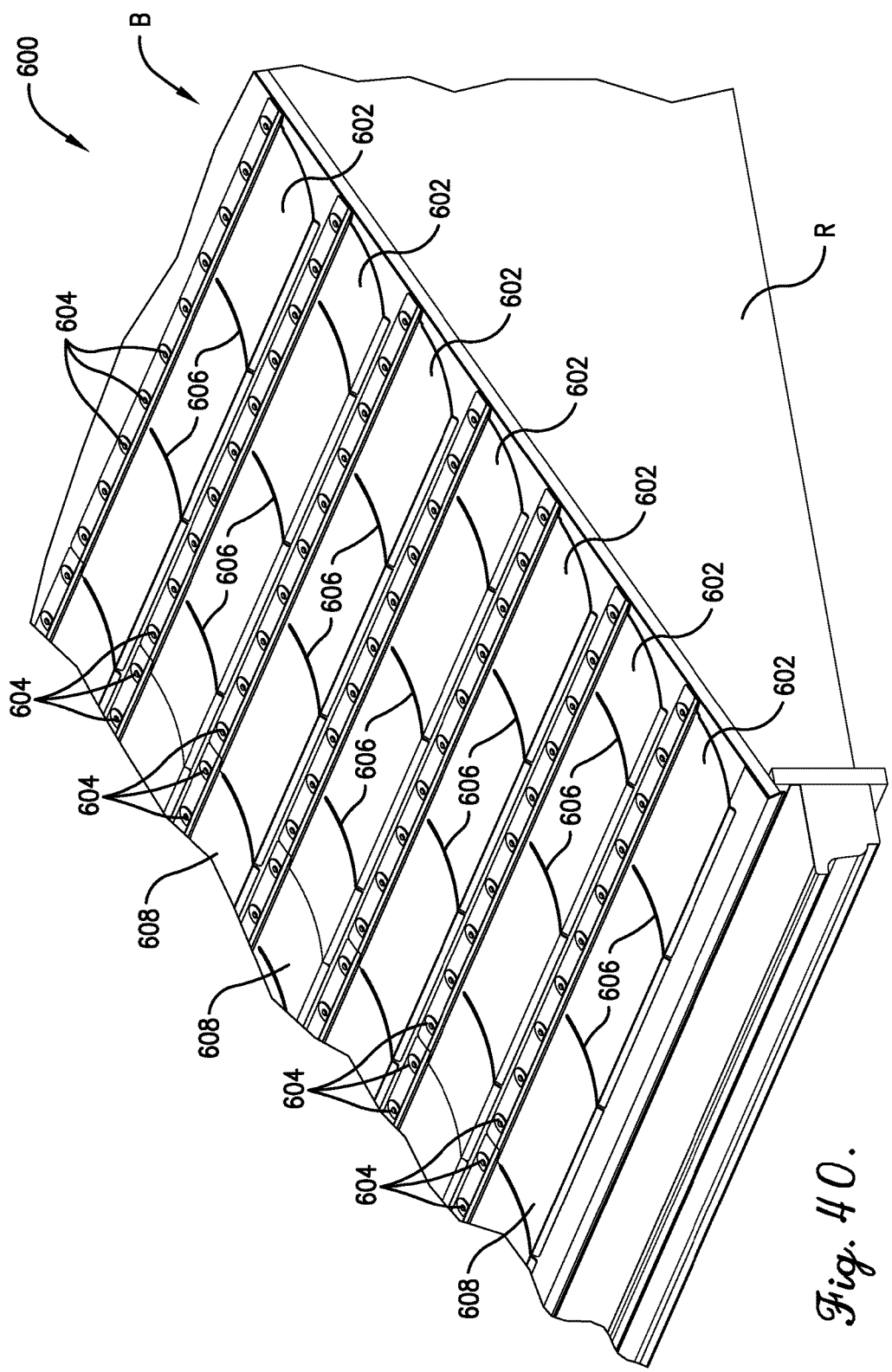
Figure 41:
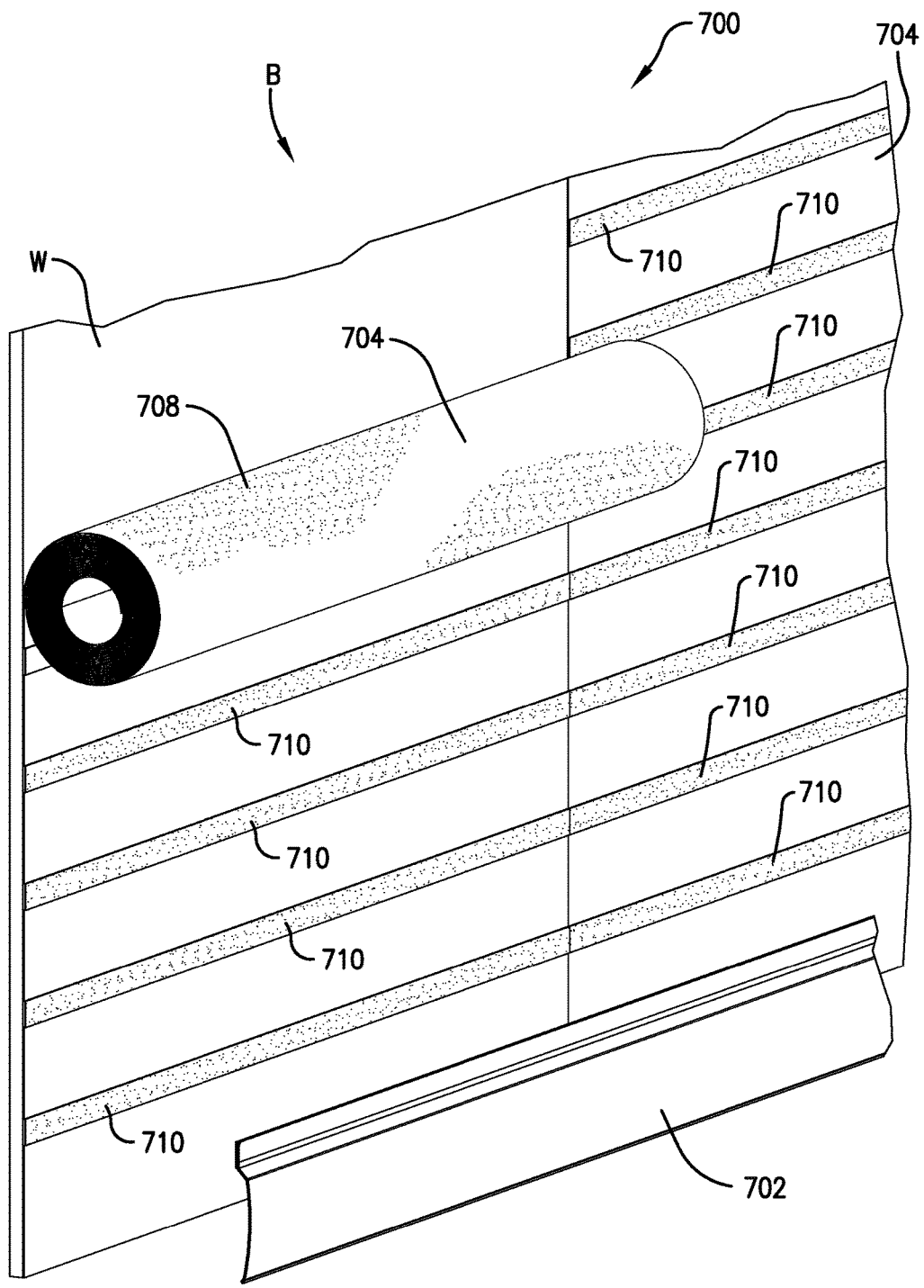
Figure 42:
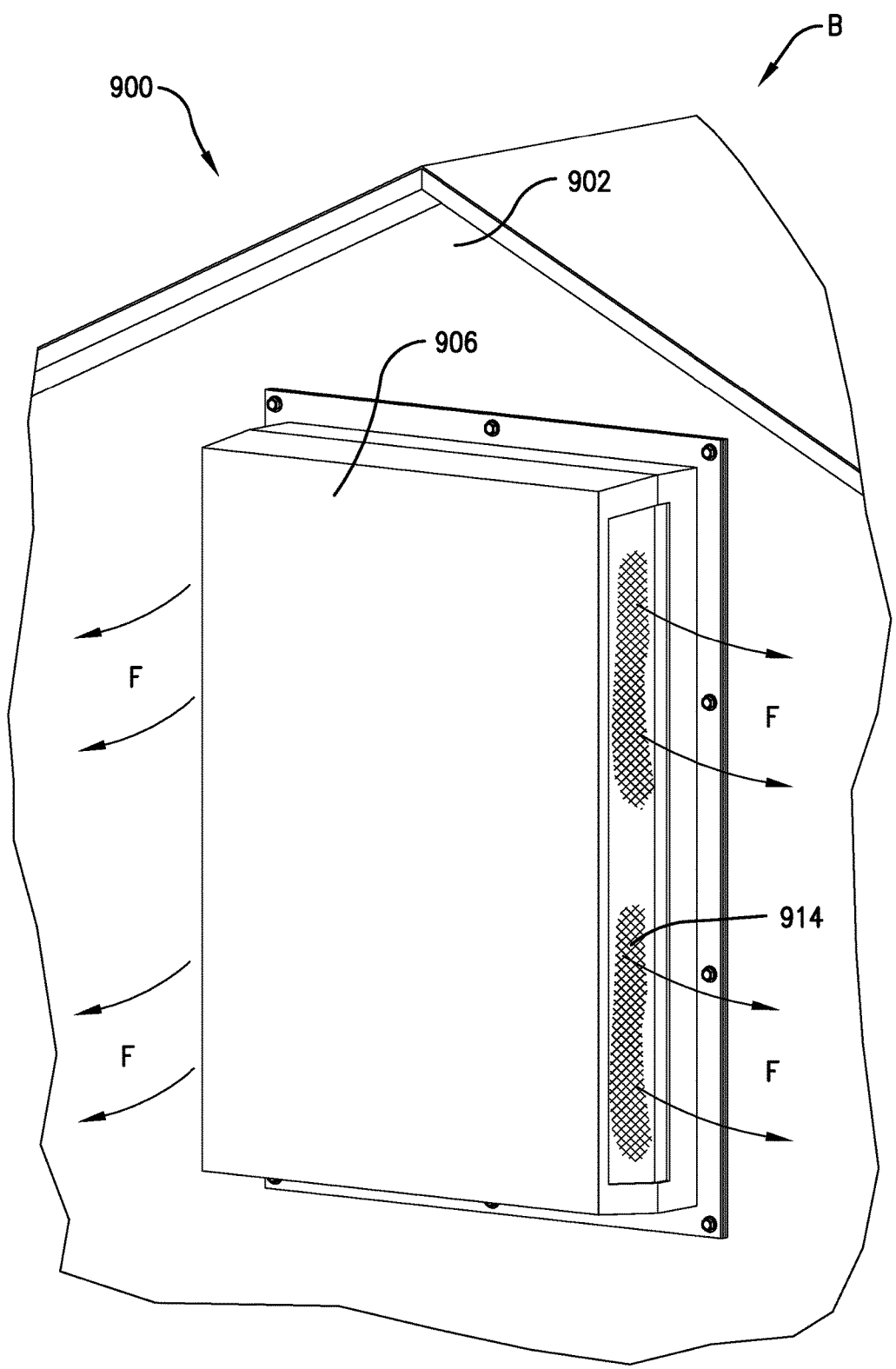
Figure 43:
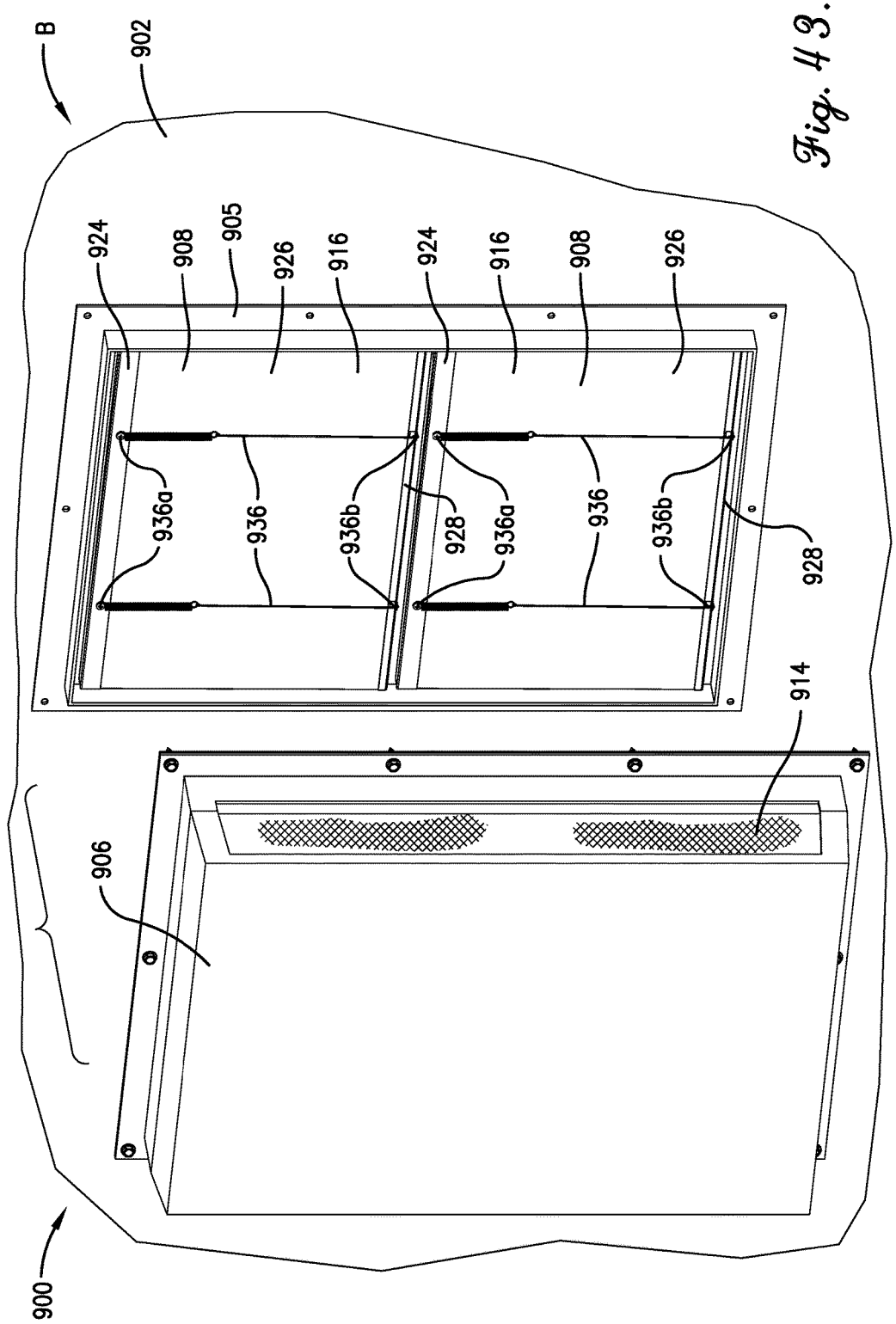
Figure 44:
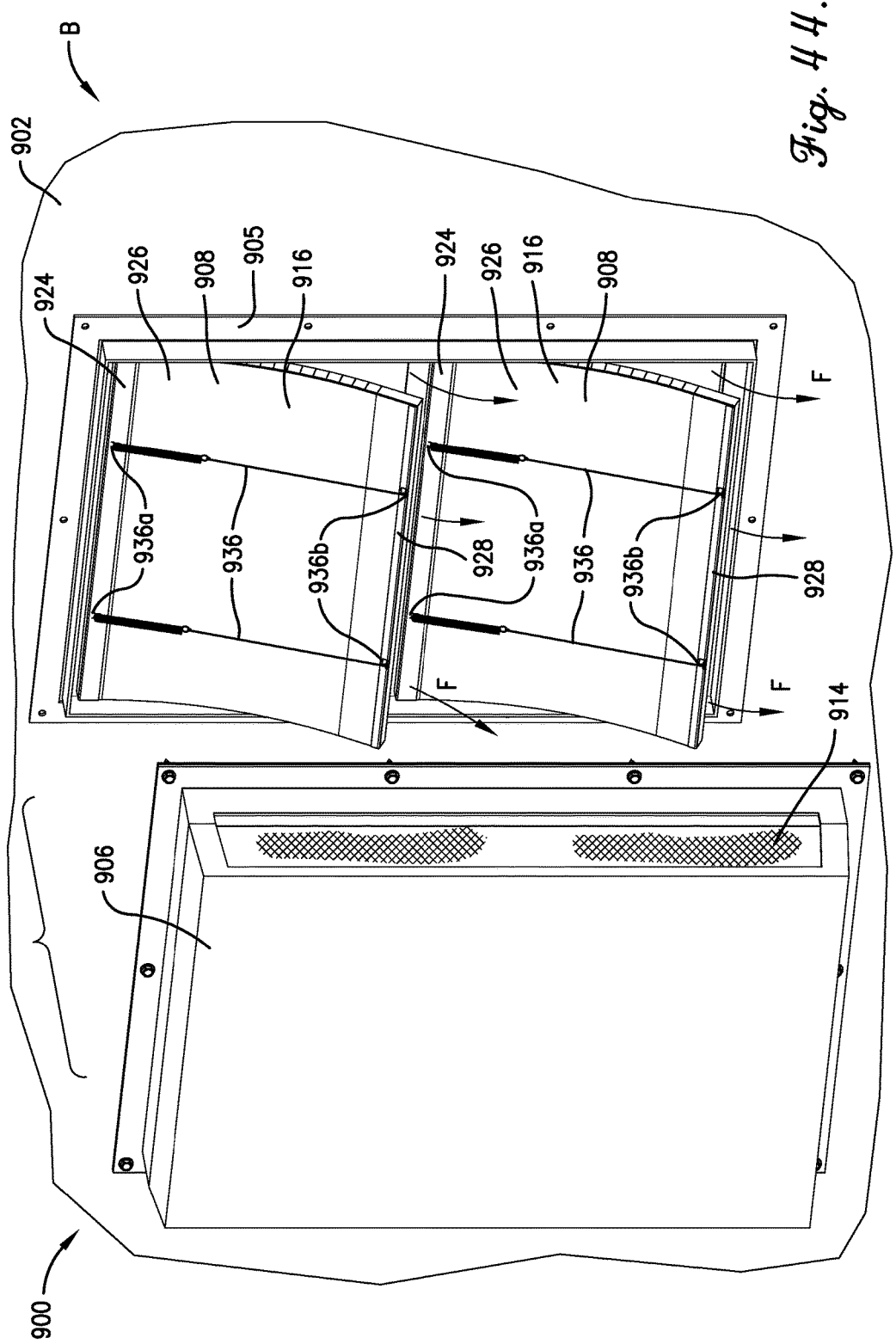
Figure 45:
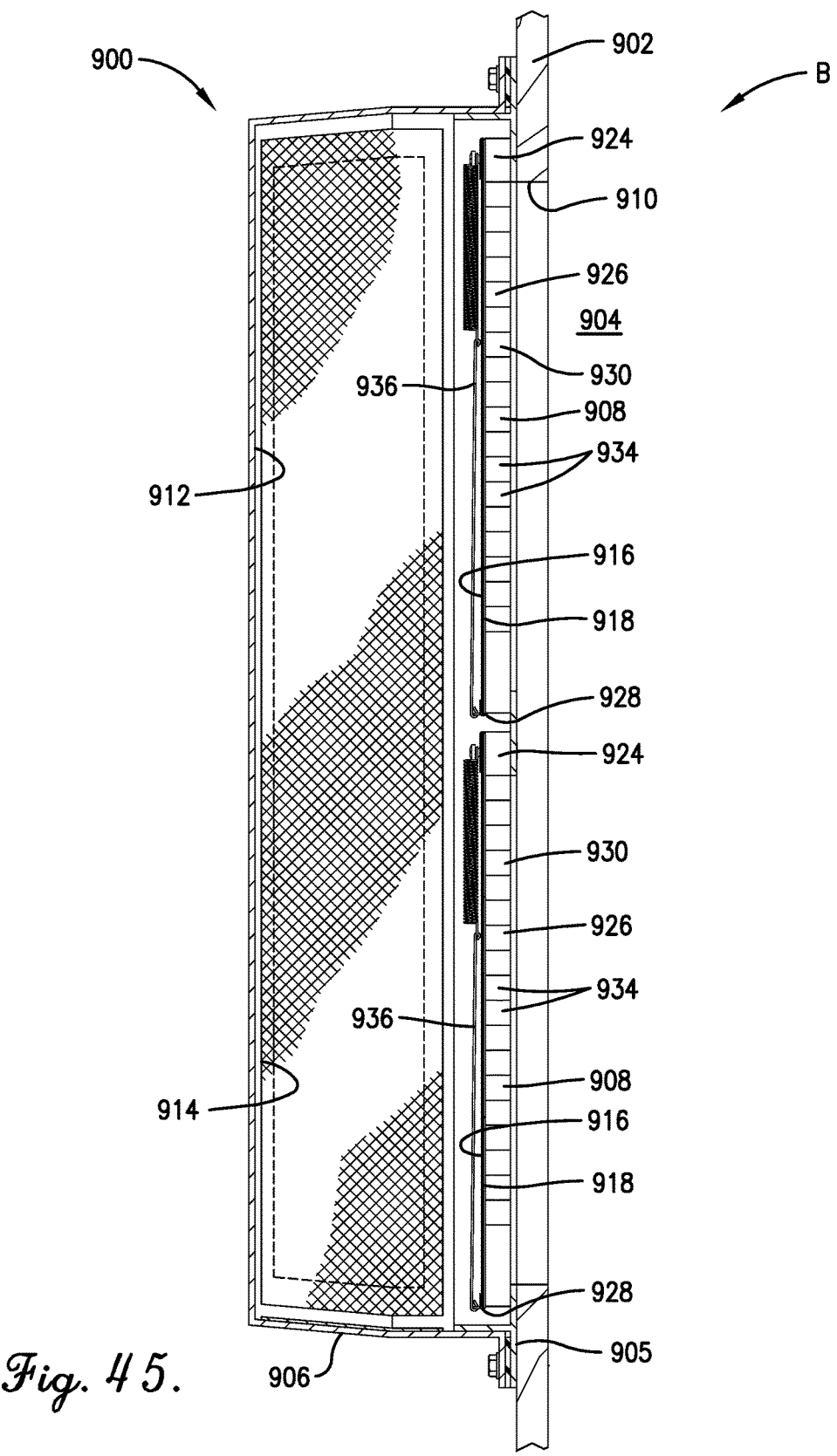
Figure 46:
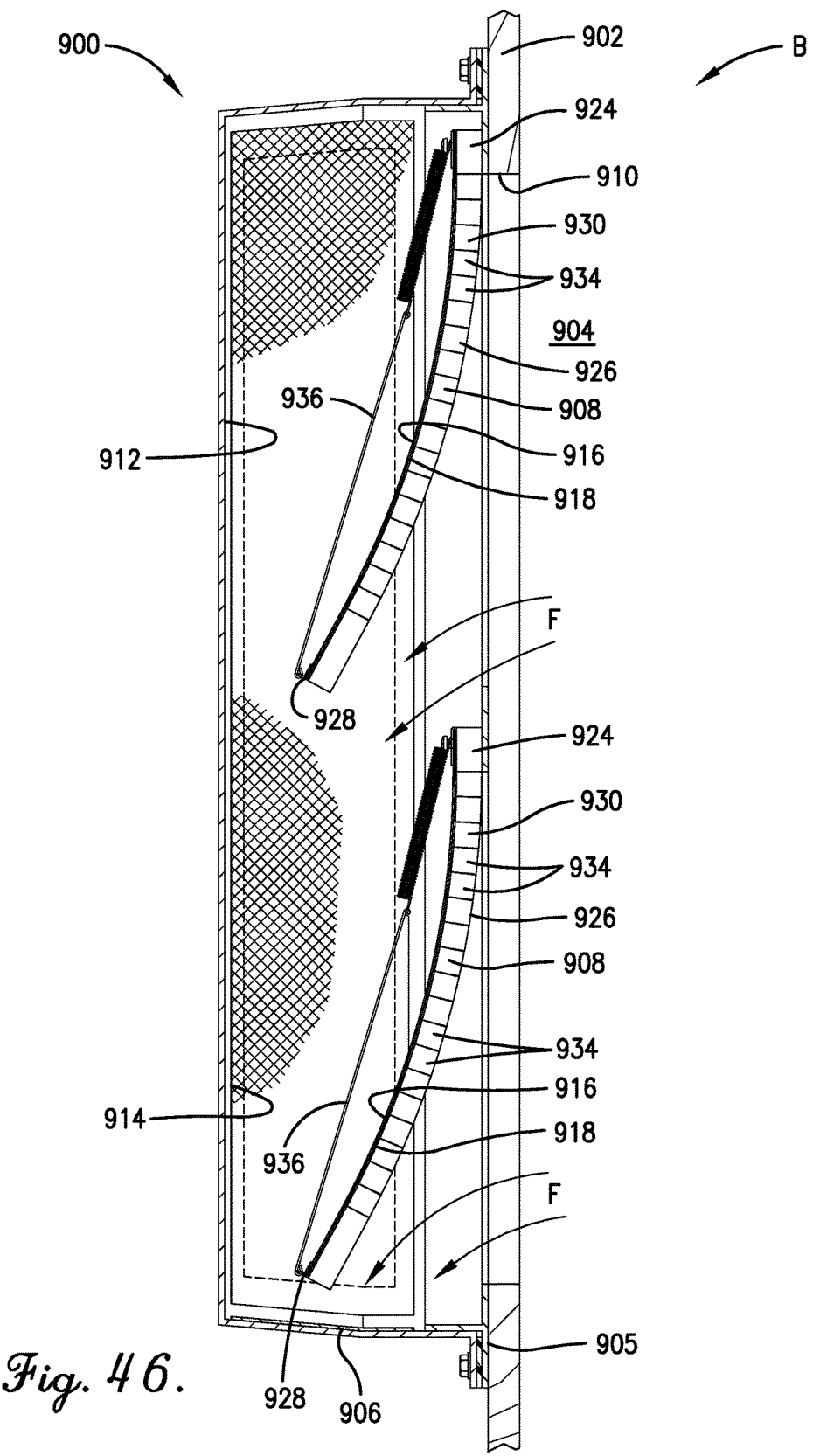
Figure 47:
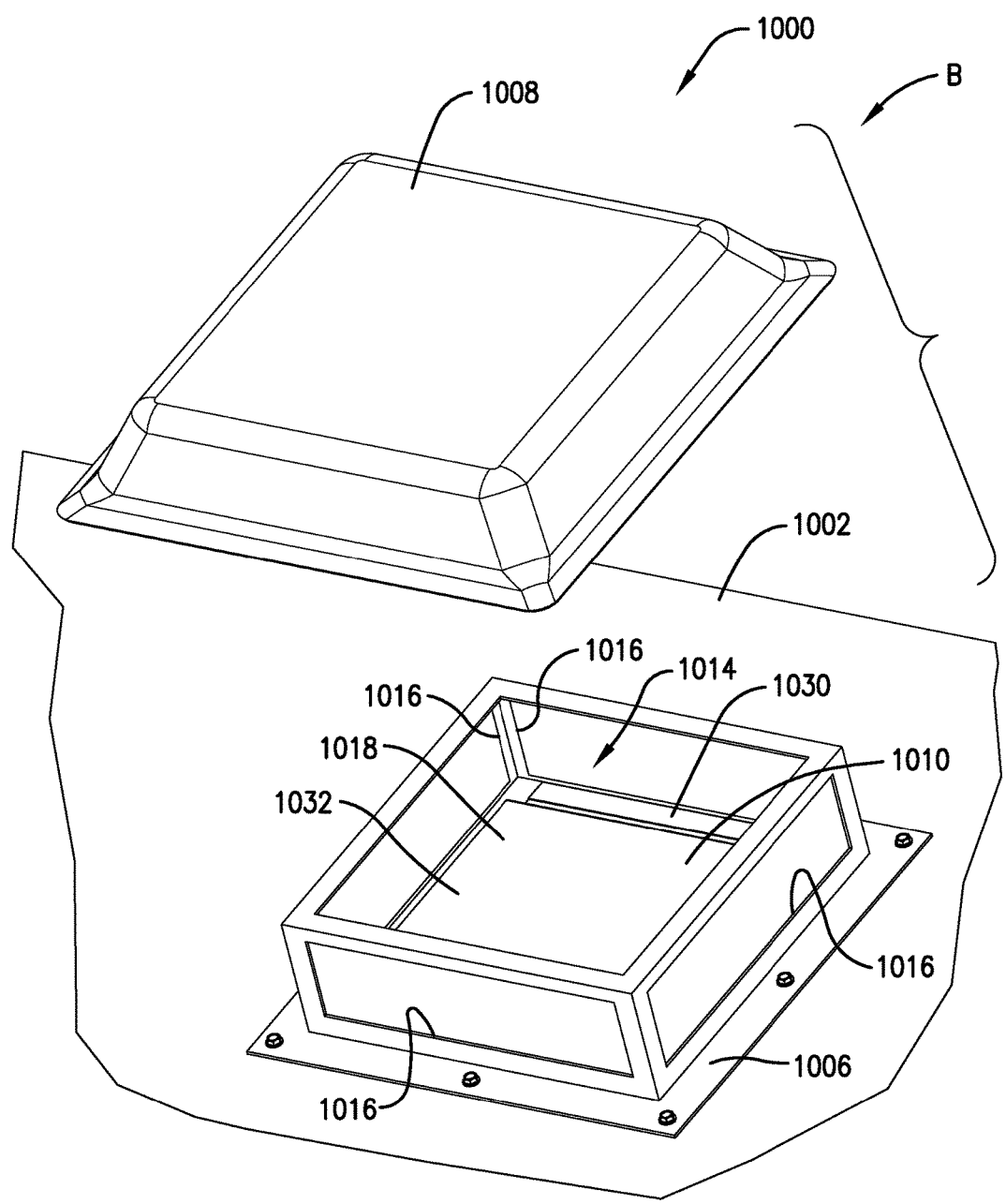
Figure 48:
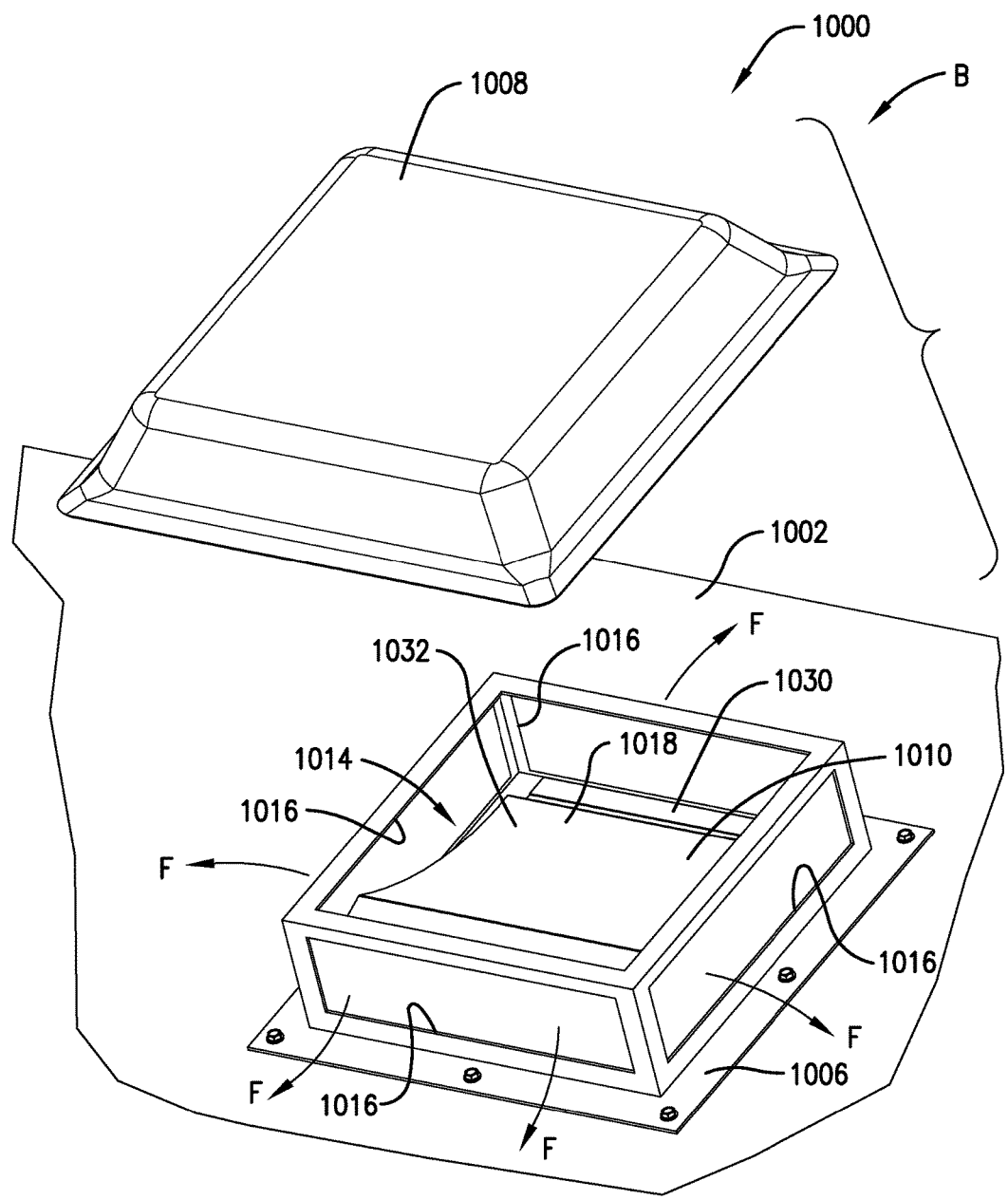
Figure 51:
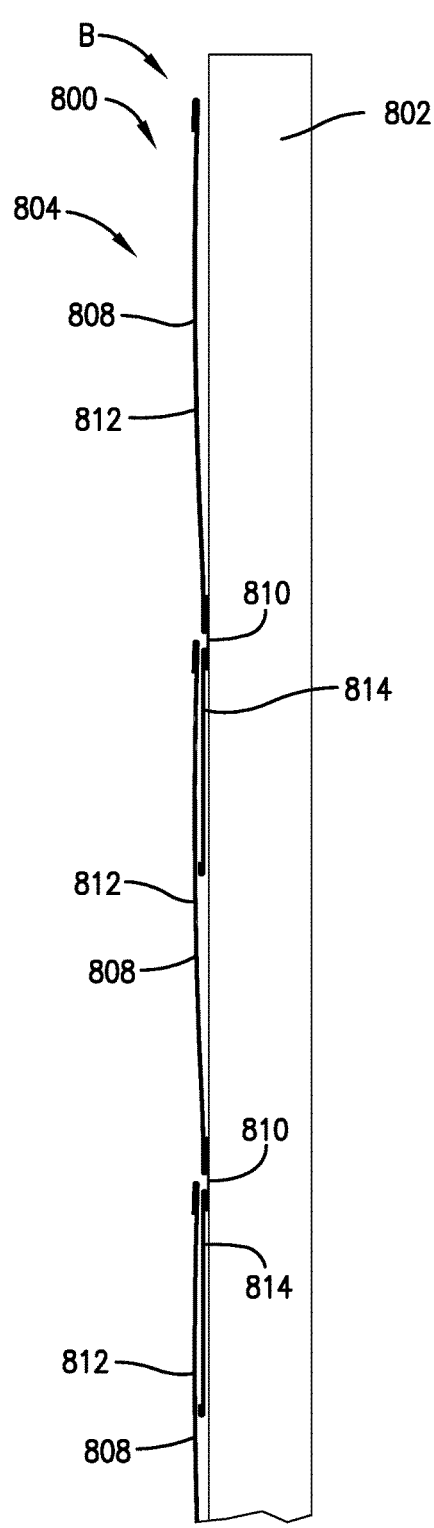
Figure 52:
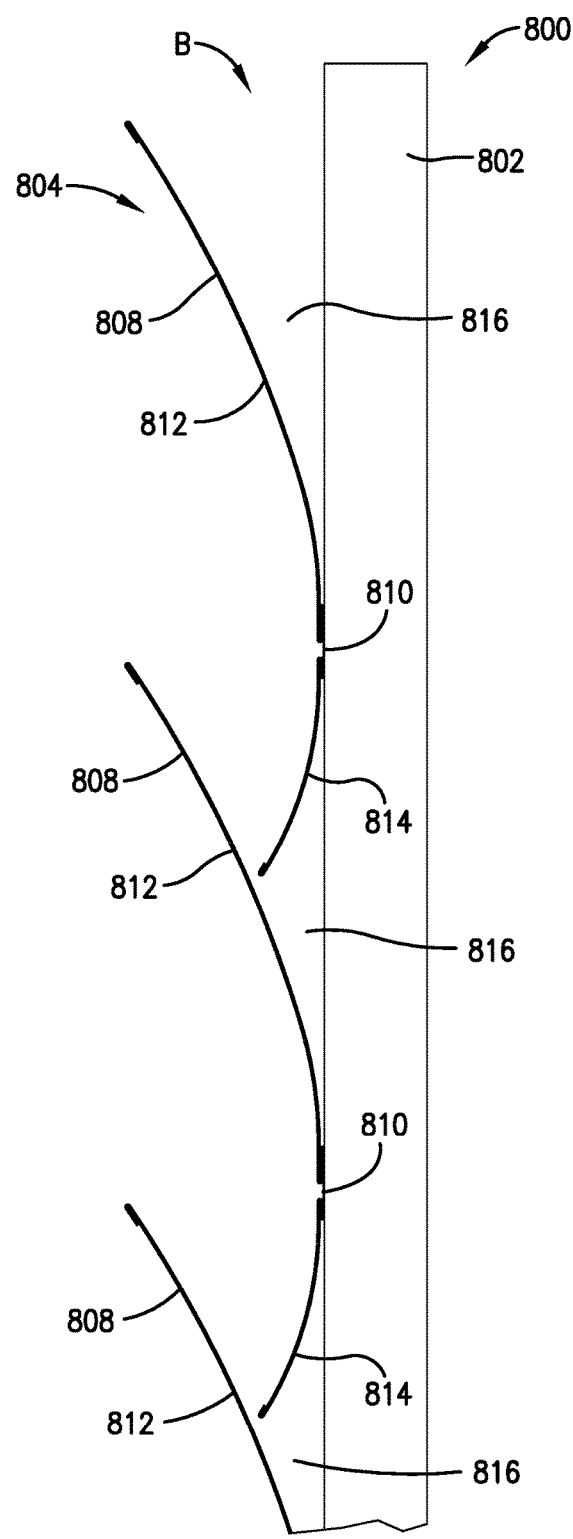
Figure 55:
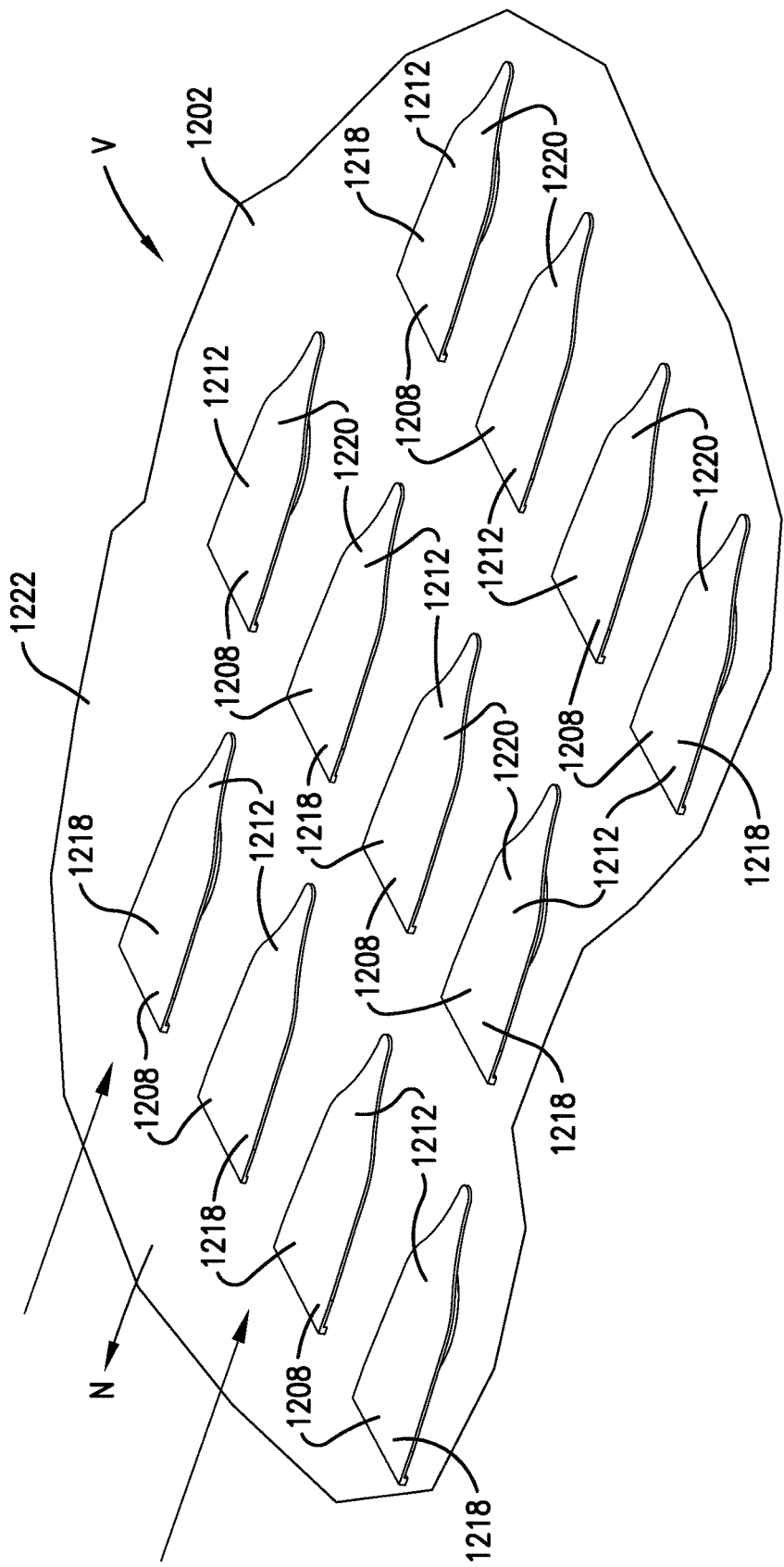
Figure 56:
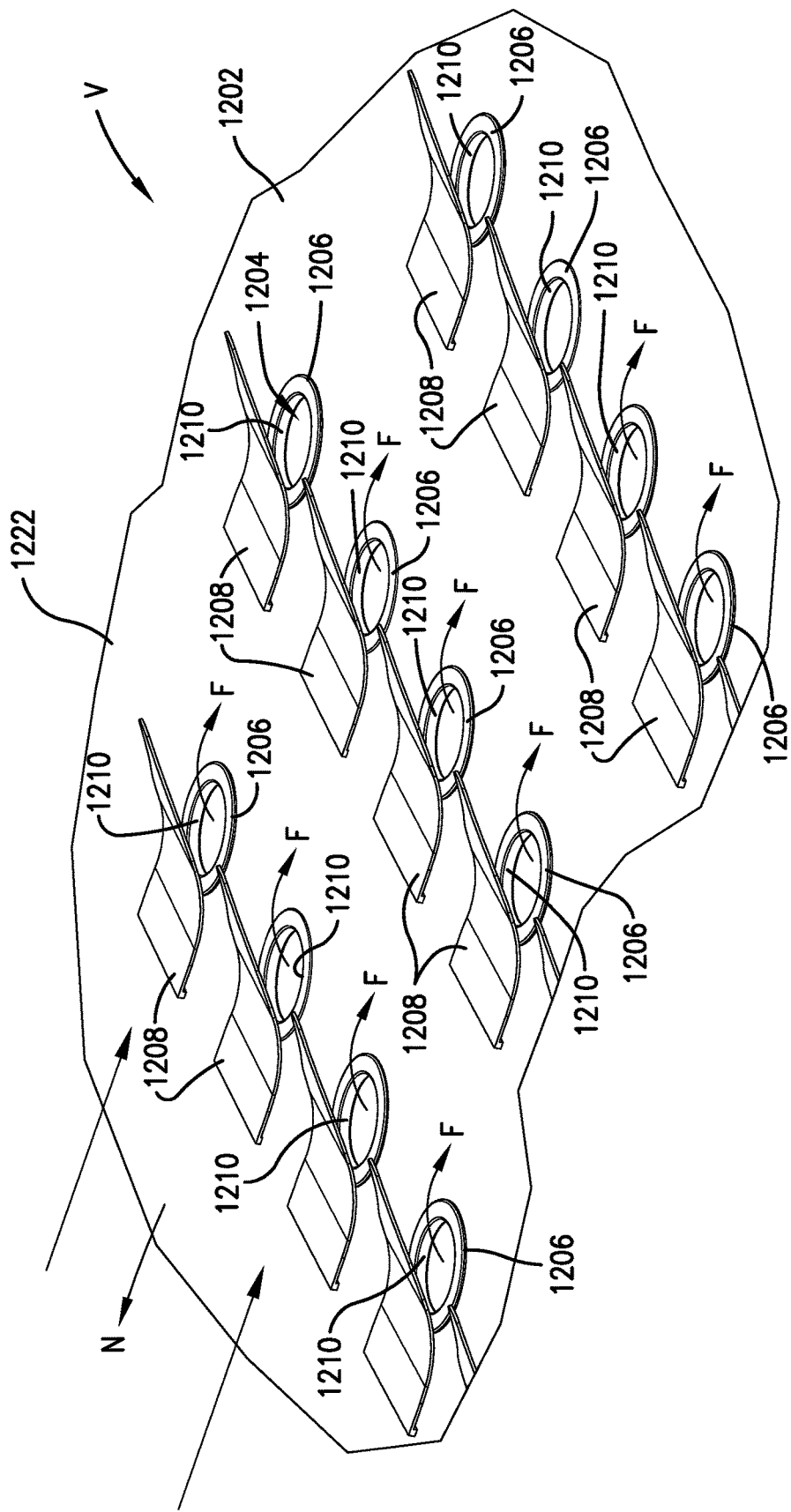

FIG. 3a is a cross section of an enclosed building with an enclosure wall and a wall covering constructed in accordance with a second preferred embodiment of the present invention, with the wall covering including panels with a foam layer, and showing upper and lower pairs of panels flexed into a sealed condition in response to the covering temperature being below the normal operating temperature of the panels, where each of the upper panels is in sealing engagement with a corresponding lower panel;

FIG. 3b is a cross section of the building similar to FIG. 3a, but showing the panels flexed out of the sealed condition to an unsealed condition in response to the covering temperature of the panels rising to the normal operating temperature, with the exposed surface of the panels being generally planar;

FIG. 3c is a cross section of the building similar to FIG. 3b, but showing the panels flexed to another unsealed condition in response to the covering temperature rising to a temperature above the normal operating temperature, with the exposed surface of the panels being generally concave;

FIG. 4 is an enlarged fragmentary perspective of one of the panels shown in FIGS. 1-2c, showing outer and inner panel layers joined by an intermediate adhesive layer, with a coating layer being applied to an outer surface of the outer panel layer;

FIG. 5 is a fragmentary perspective of the wall covering shown in FIGS. 1-2c and 4, showing one of the panels and corresponding fasteners exploded from the underlying wall;

FIG. 5a is a fragmentary perspective of one of the panels shown in FIGS. 1-2c, 4, and 5, showing a bumper covering a lower corner of the panel;

FIG. 5b is a fragmentary perspective of one of the panels shown in FIGS. 1-2c and 4-5a, showing a bumper covering a lower corner and lowermost edge of the panel;

FIG. 6 is a fragmentary perspective of the wall covering similar to FIG. 5, but showing the panels secured to the underlying wall with staples;

FIG. 7 is a fragmentary perspective of the wall covering similar to FIG. 6, but showing the panels secured to the underlying wall with elongated adhesive strips;

FIG. 7a is a fragmentary perspective of the wall covering similar to FIG. 7, but taken from the opposite side of the wall covering;

FIG. 8 is an enlarged perspective of the wall covering shown in FIGS. 1-2c and 4-5b, but showing one of the panels mounted to the wall with alternative fasteners;

FIGS. 9-22 are cross sections of laminate composite panels constructed in accordance with other preferred embodiments of the present invention;

FIG. 23-35 are fragmentary cross sections of laminate composite panels constructed in accordance with other preferred embodiments of the present invention, and showing various preferred end margin constructions of the panels;

FIG. 36 is a fragmentary perspective of an enclosed building with an enclosure wall and a wall covering constructed in accordance with another preferred embodiment of the present invention, with the wall including rows of blocks and the wall covering including panels and fastening brackets to mount the panels to the blocks;

FIG. 37 is a fragmentary perspective of the enclosed building similar to FIG. 36, but taken from the opposite side of the wall covering;

FIG. 38 is an enlarged fragmentary cross section of the enclosed building shown in FIGS. 36 and 37, showing one of the panels attached to a corresponding one of the brackets;

FIG. 39 is a fragmentary perspective of an enclosed building with a roof and a wall covering constructed in accordance with another preferred embodiment of the present invention, with the wall covering including adjacent pairs of upper and lower panels attached to the roof with fasteners, where each of the upper panels is in sealing engagement with a corresponding lower panel;

FIG. 40 is a fragmentary perspective of the enclosed building similar to FIG. 39, but showing the panels flexed from the sealed condition to an unsealed condition;

FIG. 41 is a fragmentary perspective of an enclosed building with an underlying wall and a wall covering constructed in accordance with another preferred embodiment of the present invention, with the wall covering including multiple webs attached to the underlying wall and further including panels attached to the webs;

FIG. 42 is a fragmentary perspective of an enclosed building with a gable roof and an enclosure vent constructed in accordance with another preferred embodiment of the present invention, with the enclosure vent including a vent frame, a vent cover, and vent panels;

FIG. 43 is a fragmentary perspective of the enclosed building similar to FIG. 42, but with the vent cover exploded from the frame to show the vent panels in a sealed condition;

FIG. 44 is a fragmentary perspective of the enclosed building similar to FIG. 43, but with the vent panels flexing outwardly from the frame in an unsealed condition;

FIG. 45 is a cross section of the enclosed building shown in FIGS. 42-44, showing the vent panels in the sealed condition;

FIG. 46 is a cross section of the enclosed building similar to FIG. 45, but showing the vent panels in the unsealed condition;

FIG. 47 is a fragmentary perspective of an enclosed building with a roof and a roof vent constructed in accordance with another preferred embodiment of the present invention, with the roof vent including a vent frame, a vent cover, and a vent panel, and showing the vent cover exploded from the vent frame to depict the vent panel in a sealed condition;

FIG. 48 is a fragmentary perspective of the enclosed building similar to FIG. 47, but showing the vent panel flexed into an unsealed condition;

FIG. 49 is a fragmentary cross section of the enclosed building shown in FIGS. 47 and 48, showing the vent panel in the sealed condition;

FIG. 50 is a fragmentary cross section of the enclosed building similar to FIG. 49, but showing the vent panel flexed into the unsealed condition;

FIG. 51 is a fragmentary side elevation of a building including a door and door covering constructed in accordance with another preferred embodiment of the present invention, with the covering including panels that each include an attachment region, an upper flap, and a lower flap;

FIG. 52 is a fragmentary side elevation of the building similar to FIG. 51, but showing the flaps of the panels flexed away from the door in response to an elevated covering temperature;

FIG. 53 is a fragmentary perspective of an enclosed building with a roof and a roof vent constructed in accordance with another preferred embodiment of the present invention, with the roof vent including a vent panel and a vent plug, showing the vent panel in a sealed condition;

FIG. 54 is a fragmentary perspective of the enclosed building similar to FIG. 53, but showing the vent panel flexed into an unsealed condition;

FIG. 55 is a fragmentary perspective of an automobile with a roof and roof vents constructed in accordance with another preferred embodiment of the present invention, with each roof vent including a vent frame and a vent panel, showing the vent panel in a sealed condition; and FIG. 56 is a fragmentary perspective of the enclosed building similar to FIG. 55, but showing the vent panel flexed into an unsealed condition.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Thermally Adaptive Wall Covering

Turning initially to FIGS. 1-2c, an exterior thermally adaptive wall covering 100 is configured to adaptively insulate an enclosed building B and is constructed in accordance with a first preferred embodiment of the present invention. As will be explained, the wall covering 100 is preferably attached to enclosure walls W along an exterior of building B to cover at least part of the walls W. When installed on the walls W, the wall covering 100 is configured to move in response to a change in temperature experienced by the covering 100 (which is referred to herein as the covering temperature).

While the wall covering 100 is preferably mounted to walls W that are generally stationary, the wall covering 100 could be installed on a wall structure that moves. For instance, as will be shown in a subsequent embodiment, the wall covering 100 could be attached to a door.

The illustrated building B comprises a conventional single-family, residential home with stud walls that each include an outer sheath S. However, the principles of the present invention are applicable to various types of buildings. For instance, the wall covering 100 of the present invention could be applied as an adaptive insulation to other residential buildings, such as a garage, shed, shop, lean-to, or barn. Also, the use of wall covering 100 could extend to use on various types of commercial buildings, such as a commercial office, retail building, or warehouse.

It will be appreciated that the building B is fully enclosed and includes an interior space that is climate controlled using conventional heating, ventilating, and air-conditioning (HVAC) equipment (not shown). However, it is within the scope of the present invention where the wall covering 100 is installed on a building without HVAC equipment. Furthermore, the wall covering 100 could be installed on a building structure (such as a shed) with one or more building openings that remain open permanently such that the building is only partly enclosed.

The outer sheath S installed on building B preferably includes sheets of engineered wood product, such as pressed wood material or plywood, fastened to studs (not shown). However, it is within the scope of the present invention where the wall W includes an alternative sheath S. For instance, the sheath S could include a metal sheet material (e.g., having a metal material such as aluminum, carbon steel, etc.). The illustrated wall W can be variously configured without departing from the scope of the present invention.

Turning to FIGS. 1-2c and 4-8, the covering 100 preferably includes laminated composite panels 102 and fasteners 104. Each laminated composite panel 102 comprises a generally unitary construction that extends along a longitudinal axis A (see FIG. 1) and is configured to flex in response to a covering temperature change.

The laminated composite panel 102 preferably includes outer and inner panel layers 106,108 (see FIGS. 2a and 4) that are preferably continuous and generally coextensive with one another. The panel 102 also preferably includes an adhesive layer 110 that provides a connecting structure between the panel layers 106,108. In the illustrated embodiment, the adhesive layer 110 preferably extends continuously between the panel layers 106,108 to bond the panel layers 106,108 to each other. The adhesive layer 110 is preferably formed between the panel layers 106,108 so that the adhesive layer 110 includes substantially no gas pockets or voids.

In the illustrated embodiment, the panel layers 106,108 are preferably bonded along an interface 112 (see FIG. 2a) defined between the panel layers 106,108. The interface 112 of the illustrated panel 102 extends generally parallel to the panel layers 106,108, although the interface 112 could be in a nonparallel arrangement relative to at least one of the panel layers 106,108.

Each panel layer 106,108 comprises a unitary and continuous sheet of material. Each panel layer 106,108 is preferably configured to expand and contract in response to any change in covering temperature. Furthermore, each panel layer 106,108 is preferably configured to expand and contract along the interface 112 (i.e., along a direction in which the interface 112 extends). More preferably, each panel layer 106,108 is operable to expand and contract in a width direction H (see FIG. 2b) associated with the panel 102, with the width direction H being generally orthogonal to the longitudinal axis A. However, for some aspects of the present invention, the panel 102 could be operable to expand and contract in a direction that is off-axis from the width direction H.

The adhesive layer 110 preferably permits expansion and/or contraction of each panel layer 106,108 along the interface 112 and relative to the other panel layer 106,108 in response to the covering temperature change so that the panel 102 flexes. In particular, the adhesive layer 110 preferably permits each panel layer 106,108 to expand and contract relative to the other layers 106,108 along the width direction H.

The adhesive layer 110 preferably includes an adhesive material with an adhesive modulus of elasticity. The adhesive modulus of elasticity is preferably less than the modulus of elasticity of the materials forming each panel layer 106,108. However, for some aspects of the present invention, the adhesive material could have a relatively high modulus of elasticity. For instance, the panel 102 could have an alternative connecting structure that includes an adhesive with a high modulus of elasticity and another layer with a modulus of elasticity less than the modulus of elasticity of both panel layers 106,108. More preferably, the adhesive material also comprises a viscoelastic damping material that dampens relative movement between the panel layers 106, 108.

The adhesive layer 110 preferably includes an adhesive material selected from the group consisting of epoxy resin, elastomeric resin, silicone, and combinations thereof. For instance, it has been found that one suitable adhesive for adhesive layer 110 is a two-component thermosetting epoxy that provides a relatively rigid adhesive layer 110. One preferred thermosetting epoxy is Loctite® 9433 Hysol® Epoxy Adhesive, supplied by Henkel Corporation. Another suitable adhesive for adhesive layer 110 is a silicone adhesive, such as an RTV silicone adhesive. One preferred silicone adhesive is a two-component adhesive PNS-56228, supplied by Protavic America, Inc. However, it is within the scope of the present invention where the adhesively layer 110 includes an alternative adhesive material.

Additionally, for some aspects of the present invention, the panel 102 could include more than one adhesive layer or could be devoid of adhesive (e.g., where the panel layers 106,108 are connected by discrete fasteners).

As will be discussed, the panel 102 could include an alternative connecting structure with one or more different types of continuous layers that join the panel layers 106,108 relative to one another. For instance, one alternative connecting structure could include a damping material other than adhesive to dampen relative movement between the panel layers 106,108.

The panel 102 also preferably includes a coating layer 114 applied to and covering the outer panel layer 106. The coating layer 114 is generally exposed and faces away from the enclosure wall W when an attachment region 116 of the panel 102 is attached to the enclosure wall W.

The coating layer 114 preferably comprises an outdoor latex paint. However, the coating layer 114 could alternatively comprise a material selected from the group of enamel paint, latex paint, powder-coated paint, and combinations thereof.

The illustrated panel 102 preferably includes the layers 106,108,110,114. However, as will be discussed in a subsequent embodiment, panel 102 could include a foam layer adhered to an outside surface of the inner panel layer 108.

In the illustrated embodiment, the panel 102 preferably defines a hem margin 118 and a shiftable flap 120 that are integrally formed. The flap 120 is preferably configured to shift relative to the hem margin 118 in response to a covering temperature change.

The flap 120 preferably includes an extension section 122, a flap body 124, and a lip 126 (see FIGS. 2a-2c and 4). The extension section 122 interconnects the hem margin 118 and the flap body 124 and preferably extends laterally at an oblique angle to the hem margin 118. The hem margin 118 and the extension section 122 preferably meet along a bend line 125a. The extension section 122 and the flap body 124 preferably meet along a bend line 125b.

The flap body 124 preferably presents an outwardly facing exposed surface 128. As will be discussed, the exposed surface 128 is configured to shift between a planar shape (see FIG. 2b), a convex shape (see FIG. 2a), and a concave shape (see FIG. 2c) as the panel 102 flexes in response to a covering temperature change. However, the principles of the present invention are applicable where the exposed surface 128 shifts among an alternative range of shapes.

The hem margin 118 preferably provides the attachment region 116 along which the panel 102 is configured to be attached to the enclosure wall W. In the illustrated embodiment, the inner panel layer 108 is preferably folded onto the outer panel layer 106 so that the panel layers 106,108 cooperatively define the hem margin 118.

The hem margin 118 preferably extends along the axis A and presents a generally planar wall engaging surface 130 (see FIGS. 2a-2c). When the hem margin 118 is attached to the enclosure wall W, the flap 120 is preferably cantilevered from the hem margin 118 and is shiftable relative thereto. However, as will be shown in subsequent embodiments, the attachment region 116 could be alternatively configured without departing from the scope of the present invention.

The panel also preferably presents a lowermost margin 132 opposite the hem margin 118. The lip 126 is formed by folding the first and second panel layers 106,108 of the lowermost margin 132 onto themselves. However, the margin 132 could be alternatively formed to produce a lip. For instance, only one of the panel layers 106,108 of the lowermost margin 132 could be folded over to form the lip.

The illustrated lip 126 presents exposed corners 134 and an exposed lowermost edge 136 (see FIGS. 2a-2c and 5). However, as illustrated in FIG. 5a, the panel could include bumpers 138 fixed to the corners 134 to cover the corners 134 and to restrict a person from being contacted by the corners 134.

Similarly, as illustrated in FIG. 5b, the panel 102 could include a continuous elongated bumper 140 that covers the corners 134 and the lowermost edge 136 and restricts a person from being contacted by the corners 134 and the lowermost edge 136.

Each panel 102 preferably presents a panel width dimension D1 that ranges from about four inches (4") to about fourteen inches (14") (see FIG. 2b). More preferably, in the illustrated embodiment, the width dimension D1 ranges from about six inches (6") to about eight inches (8"). However, the width dimension D1 could fall outside of these ranges in connection with some aspects of the present invention. Each panel 102 also preferably presents a length dimension (not shown) that ranges from about one foot (1') to about forty feet (40'), although the length dimension could fall outside of this range.

The outer and inner panel layers 106,108 preferably have, respectively, outer and inner coefficients of thermal expansion (CTE). The outer and inner coefficients of thermal expansion are different from each other and cause expansion and contraction of the corresponding panel layers 106,108 along the interface 112.

Preferably, the inner coefficient of thermal expansion of the inner panel layer 108 is greater than the outer coefficient of thermal expansion of the outer panel layer 106. As a result, the flap 120 is preferably configured to shift away from the enclosure wall W in response to an increasing covering temperature and configured to flex toward the enclosure wall W in response to a decreasing covering temperature.

In the illustrated embodiment, the outer coefficient of thermal expansion preferably ranges from about negative five (−5) microstrain per degree Celsius to about five (5) microstrain per degree Celsius. A positive value of coefficient of thermal expansion generally refers to a material that expands, in at least one dimension, as the material temperature increases and contracts, in at least one dimension, as the material temperature decreases. A negative value of coefficient of thermal expansion generally refers to a material that contracts, in at least one dimension, as the material temperature increases and expands, in at least one dimension, as the material temperature decreases.

Also, the inner coefficient of thermal expansion preferably ranges from about ten (10) microstrain per degree Celsius to about one thousand (1000) microstrain per degree Celsius. However, the coefficients of thermal expansion for the panel layers 106,108 could fall outside of these ranges without departing from the scope of the present invention.

Whether or not the inner and outer coefficients of thermal expansion fall within the above-listed ranges, the coefficients of thermal expansion are preferably different from one another so that the panel 102 changes shape in response to a change in temperature. In other words, the panel layers 106,108 preferably exhibit a difference in coefficient of thermal expansion (ΔCTE) that equals the value of inner CTE minus the value the value of outer CTE. The ΔCTE value for the panel 102 preferably ranges from about fifteen (15) microstrain per degree Celsius to about one thousand (1000) microstrain per degree Celsius.

The outer panel layer 106 preferably includes a material selected from the group consisting of graphite, epoxy resin, graphene, Invar, and combinations thereof. However, the outer panel layer 106 could include another material consistent with the scope of the present invention.

The inner panel layer 108 preferably includes a material selected from the group consisting of aluminum, copper, magnesium, vinyl, stainless steel, and combinations thereof. However, the inner panel layer 108 could include another material consistent with the scope of the present invention.

The outer panel layer 106 preferably presents a layer thickness that ranges from about five thousandths of an inch (0.005") to about ten thousandths of an inch (0.010"). The inner panel layer 108 also preferably presents a layer thickness that ranges from about five thousandths of an inch (0.005") to about ten thousandths of an inch (0.010"). However, one or both of the layer thicknesses could fall outside of the corresponding range without departing from the scope of the present invention.

The principles of the present invention are equally applicable where the panel 102 has an alternative connecting structure that permits expansion and/or contraction of each panel layer 106,108 relative to the other panel layer 106,108 in response to the covering temperature change so that the panel 102 flexes. Preferably, in various alternative embodiments, the connecting structure includes one or more continuous layers that bond the panel layers 106,108 relative to one another. Where the alternative connecting structure includes one or more continuous layers, at least one of the layers preferably includes a material with a modulus of elasticity that is less than the modulus of elasticity of each panel layer 106,108.

In some embodiments, the alternative connecting structure could include a damping material configured to dampen relative movement between the panel layers 106,108. For instance, as will be shown in a subsequent embodiment, the connecting structure could include an intermediate foam layer (not shown) located between the layers 106,108 and bonded to each panel layer 106,108 with a corresponding layer of adhesive.

In such an alternative embodiment, the adhesive of each adhesive layer preferably comprises a damping material and has an adhesive modulus of elasticity less than the modulus of elasticity of the materials forming each panel layer 106,108.

While the illustrated panel 102 preferably only includes two panel layers 106,108, it is within the ambit of the present invention for the panel 102 to include more than two panel layers 106,108. For instance, an alternative connecting structure could include a third panel layer located intermediate the outer and inner panel layers 106,108. In one such alternative embodiment, the intermediate panel layer could have an intermediate coefficient of thermal expansion that is closer to the inner coefficient of thermal expansion than the outer coefficient of thermal expansion. For instance, the intermediate coefficient of thermal expansion could range from about eighty percent (80%) of the inner coefficient of thermal expansion to about one hundred twenty percent (120%) of the inner coefficient of thermal expansion.

In another alternative embodiment, the intermediate panel layer could have an intermediate coefficient of thermal expansion that is closer to the outer coefficient of thermal expansion than the inner coefficient of thermal expansion. For instance, the intermediate coefficient of thermal expansion could range from about eighty percent (80%) of the outer coefficient of thermal expansion to about one hundred twenty percent (120%) of the outer coefficient of thermal expansion.

Yet further, the panel 102 could have an alternative connecting structure that permits expansion and/or contraction of each panel layer 106,108 relative to the other panel layer 106,108. For some aspects of the present invention, the panel layers 106,108 could be connected by a mechanical attachment structure (such as mechanical fasteners) that permits relative sliding movement between the panel layers 106,108.

The panel 102 is preferably formed under a normal operating temperature. That is, the panel 102 is shaped during the panel manufacturing process at about the normal operating temperature. When manufactured, the panel 102 is preferably shaped so that the exposed surface 128 is generally planar at the normal operating temperature. The normal operating temperature preferably comprises the average annual temperature for the location where the panel 102 is installed for use. However, the normal operating temperature could be determined in an alternative manner. For instance, the normal operating temperature could be associated with the standard temperature of sixty-eight degrees Fahrenheit (68° F.) according to the National Institute of Standards and Technology (NIST).

Again, the flap body 124 preferably presents the outwardly facing exposed surface 128. The exposed surface 128 is generally planar when the covering temperature is at the normal operating temperature (see FIG. 2b).

Preferably, the flap 120 also flexes so that the exposed surface 128 is concave when the covering temperature is higher than the normal operating temperature (see FIGS. 2c, 4, and 5). The flap 120 also preferably flexes so that the exposed surface 128 is convex when the covering temperature is lower than the normal operating temperature (see FIGS. 1 and 2a).

The flap 120 preferably flexes so that a maximum deflection dimension D2 is defined between convex and concave positions (see FIG. 2c). The maximum deflection dimension D2 preferably ranges from about one half inch (½") to about four inches (4"). However, the maximum deflection dimension D2 could be greater than this range (e.g., when the panel 102 presents a larger panel width.

As will be discussed, the panels 102 are configured to be arranged into a series of overlapping panels 102 (see FIG. 1). Preferably, each pair of adjacent panels 102 overlaps one another so that an upper panel of each pair of adjacent panels 102 preferably overlaps a lower panel 102 of each pair of adjacent panels 102.

Each of the upper panels 102 is configured to flex into and out of an unsealed condition (see FIGS. 1, 2b, and 2c), where the flap 120 is spaced from the corresponding lower panel to define an opening O therebetween. Each of the upper panels 102 is also configured to flex into and out of a sealed condition (see FIGS. 1 and 2a), where the flap 120 engages the corresponding lower panel 102.

The elongated hem margin 118 preferably provides the attachment region 116 along which the panel 102 is configured to be attached to the enclosure wall W. The hem margin 118 preferably presents a plurality of slots 142 (see FIG. 5) spaced along the length of the panel 102.

When the hem margin 118 is attached to the enclosure wall W, the outer panel layer 106 generally overlies the inner panel layer 108 and the inner panel layer 108 generally faces the wall W. Again, the hem margin 118 is preferably formed by folding the inner panel layer 108 onto the outer panel layer 106.

However, as will be shown in subsequent embodiments, one or both of the panel layers 106,108 could be alternatively folded to form the hem margin 118 without departing from the scope of the present invention.

It is also within the ambit of the present invention where the attachment region 116 has an alternative position and/or configuration. For instance, the attachment region 116 could be spaced between upper and lower margins of the panel 102.

The panels 102 are preferably attached to the enclosure wall W with fasteners 104 of the wall covering 100. Each fastener 104 preferably includes a wall penetrating nail 144 that presents a nail head 146 (see FIGS. 2a-2c). Each fastener 104 also preferably includes a generally oblong washer 148 that is received on the nail 144 and engages the head 146 (see FIGS. 2a-2c).

The washer 148 has a generally circular disc shape that presents a curved disc edge. However, the washer 148 preferably has a portion of the disc truncated to form a generally straight disc edge. As shown in the illustrated embodiment, the washers 148 are preferably oriented so that the straight disc edges are generally parallel to the axis A. The washers 148 are also preferably oriented so that the straight disc edges are generally parallel to the bend line 125.

The fasteners 104 are spaced along the attachment region 116 and positioned to extend through corresponding slots 142. Each fastener 104 extends through the attachment region 116 and at least partly through the enclosure wall W to attach the panel 102 to the enclosure wall W.

However, the panels 102 could be secured to the enclosure wall W with an alternative fastening structure. For instance, the fasteners could include washers 150 having an alternative oblong shape with opposite straight disc edges (see FIG. 8).

Also, the panels 102 could be mounted to the enclosure wall W with staples 152 (see FIG. 6). Yet further, the panels 102 could be secured to the enclosure wall W with continuous fastening strips 154 that each include an adhesive material (see FIGS. 7 and 7a).

Preferably, the panels 102 are arranged in a series where each pair of adjacent panels overlaps one another. In the illustrated embodiment, an upper panel 102 of each pair of adjacent panels 102 preferably overlaps a lower panel 102 of each pair of adjacent panels 102.

Again, each of the upper panels 102 is configured to flex into and out of an unsealed condition, where the flap 120 is spaced from the corresponding lower panel 102 to define the opening O therebetween. Each of the upper panels 102 is also configured to flex into and out of a sealed condition, where the flap 120 engages the corresponding lower panel 102 and closes the opening O. In the sealed condition, each pair of upper and lower panels 102 cooperate with the wall W to enclose an air space defined between the upper and lower panels 102 and the wall W.

However, for some aspects of the present invention, the panels 102 could have an alternative overlapping arrangement. For instance, the lower panel of each pair of adjacent panels 102 could overlap the corresponding upper panel 102 of each pair of adjacent panels 102 (e.g., where the wall W is constructed to permit each of the upper panels 102 to flex toward the wall W to a position spaced inwardly from the corresponding upper panels 102).

In the illustrated embodiment, the exposed surface 128 of each panel 102 is generally planar when the covering temperature is at the normal operating temperature (see FIG. 2b). Also, the flap 120 preferably flexes so that the exposed surface 128 is concave when the covering temperature is higher than the normal operating temperature (see FIGS. 2c, 4, and 5). Yet further, the flap 120 preferably flexes so that the exposed surface 128 is convex when the covering temperature is lower than the normal operating temperature (see FIGS. 1 and 2a).

Each of the upper panels 102 is preferably shiftable between the unsealed condition (see FIGS. 1, 2b, and 2c), where the flap 120 is spaced from the corresponding lower panel 102 to define the opening O therebetween, and the sealed condition (see FIGS. 1 and 2a), where the flap 120 engages the corresponding lower panel to close the opening O.

The panels 102 preferably have a sealing temperature below the normal operating temperature where the upper panels 102 engage and seal the corresponding lower panels 102. When the covering temperature is above the sealing temperature, the flap 120 is preferably in the unsealed condition (see FIGS. 1, 2b, and 2c). For instance, the exposed surface 128 could have a slightly convex shape (not shown), a planar shape (see FIG. 2b), or a concave shape (see FIGS. 2c, 4, and 5) in the unsealed condition.

When the covering temperature is at or below the sealing temperature, the flap 120 is preferably in the sealed condition (see FIGS. 1 and 2a). In the sealed condition, the exposed surface 128 of the flap 120 preferably has a convex shape.

In the unsealed condition, the upper and lower panels 102 of each pair of adjacent panels 102 cooperatively define the opening O. In the sealed condition, each pair of adjacent upper and lower panels 102 cooperatively close the opening O. Furthermore, each pair of upper and lower panels 102 cooperate with the wall W to enclose an air space defined between the upper and lower panels 102 and the wall W.

In use, the illustrated panels 102 are preferably installed using conventional siding installation techniques and are configured to cover the enclosure walls W. The installed panels 102 each respond to any change in the corresponding covering temperature by shifting the flap 120 toward and away from the enclosure wall W.

For instance, as the covering temperature increases (e.g., from the normal operating temperature), the flap 120 shifts away from the enclosure wall W (see FIG. 2c). In at least some instances, this shifting movement away from the enclosure wall W can cause the flap 120 to move from the sealed condition (see FIG. 2a) to the unsealed condition (although such a change in conditions is not required).

As the covering temperature decreases (e.g., from the normal operating temperature), the flap 120 shifts toward the enclosure wall W. In at least some instances, this shifting movement toward the enclosure wall W can cause the flap 120 to move from the unsealed condition (see, e.g., FIGS. 2b and 2c) to the sealed condition (although such a change in conditions is not required).

Turning to FIGS. 3a-3c and FIGS. 9-41, alternative preferred embodiments of the present invention are depicted. For the sake of brevity, the remaining description will focus primarily on the differences of these alternative embodiments from the preferred embodiment described above.

Initially turning to FIGS. 3a-3c, an alternative wall covering 200 is constructed in accordance with a second embodiment of the present invention. The wall covering 200 is mounted to wall W and includes panels 202 and fasteners 204. Each panel 202 preferably includes outer and inner panel layers 206,208 and an intermediate adhesive layer 210. The adhesive layer 210 contacts and bonds the panel layers 206,208 to one another.

The panel 200 also preferably includes a foam layer 212 and a second intermediate adhesive layer 214 bonding the inner panel layer 208 and the foam layer 212 to one another. The inner panel layer 208 covers the foam layer 212 when an attachment region 216 is attached to the enclosure wall W.

The foam layer 208 preferably includes a conventional closed cell foam material that includes a synthetic resin material with a plurality of small, enclosed, gas pockets suspended within the resin material. More preferably, the closed cell foam material includes a polystyrene material. However, the foam material could include another synthetic resin without departing from the scope of the present invention.

The closed cell foam material of the illustrated foam layer 212 is preferable because the material has a relatively large coefficient of thermal expansion. In particular, it has been found that the gas pockets in the foam expand as the temperature of the foam increases. The gas pockets in the foam also contract as the temperature of the foam decreases. As a result, the expansion of the foam layer 212 urges a flap 220 of the panel 202 to flex away from the wall W as the foam temperature increases (e.g., as the foam temperature increases above the normal operating temperature). Similarly, contraction of the foam layer 212 urges the flap 220 of the panel 202 to flex toward the wall W as the foam temperature decreases (e.g., as the foam temperature decreases below the normal operating temperature). In this manner, the foam layer 212 preferably assists with flexing of the panel 202 toward and away from the wall W.

The illustrated foam layer 208 includes a series of foam sections 218 that extend generally parallel to each other along the longitudinal axis. Each pair of adjacent foam sections 218 is preferably shiftable toward and away from one another as the panel 202 flexes.

Each pair of adjacent foam sections 218 is also preferably in abutting engagement with one another when the covering temperature is at the normal operating temperature. As a result, each pair of adjacent foam sections 218 restricts the flap 220 of the panel 202 from flexing toward the enclosure wall W when the covering temperature is lower than the normal operating temperature. Thus, in the illustrated embodiment, the foam sections 218 cooperatively restrict an exposed surface 222 from shifting to a convex shape.

The foam layer 208 also preferably presents a relief cutout 224. The cutout 224 restricts the foam layer 208 from interfering with flexing of the panel into and out of the sealed condition.

Turning to FIGS. 9-22, various alternative panel embodiments are illustrated. The panel 300a (see FIG. 9) is constructed in accordance with a third embodiment of the present invention and includes outer and inner panel layers 302a,304a and a connecting structure 306a. The panel 300a also includes an alternative attachment region 308a, where the panel layers are preferably unfolded, and a flap 310a.

The connecting structure 306a preferably includes an intermediate foam layer 312a located between the panel layers 302a,304a. The connecting structure 306a also preferably includes layers of adhesive 314a,316a that bond the foam layer 312a to the respective panel layers 302a,304a. The foam layer 312a preferably comprises a damping material with a foam modulus of elasticity less than the modulus of elasticity of the materials forming each panel layer 302a,304a.

The adhesive of each adhesive layer 314a,316a also preferably comprises a damping material and has an adhesive modulus of elasticity less than the modulus of elasticity of the materials forming each panel layer 302a,304a.

Turning to FIG. 10, the panel 300b is constructed in accordance with a fourth embodiment of the present invention and includes three (3) sets 301b of outer and inner panel layers 302b,304b bonded to one another by corresponding adhesive layers 306b.

Each set 301b of bonded panel layers 302b,304b includes an alternative attachment region 308b, where the panel layers 302b,304b are preferably unfolded, and a flap 309b. Each set 301b of bonded layers 302b,304b is adhered to a corresponding backing strip 310b. The backing straps 310b are adhered to corresponding sets 301a of bonded panel layers 302b,304b with adhesive layers 312b. The sets 301b of bonded panel layers 302b,304b cooperatively define insulating spaces 314b therebetween. The backing strips 310b preferably include a material selected from the group consisting of wood, synthetic resin material, and a combination thereof.

Turning to FIG. 11, the panel 300c is constructed in accordance with a fifth embodiment of the present invention and includes outer and inner panel layers 302c,304c bonded to each other by an adhesive layer 306c.

The panel 300c includes an alternative attachment region 308c, where the panel layers are preferably unfolded, and an alternative flap 310c.

The alternative flap 310c preferably includes a plurality of longitudinal corrugations 312c, with an exposed surface 314c having a series of longitudinal grooves 316c. The grooves 316c present a groove depth G that ranges from about one quarter inch (¼") to about one half inch (½"), although the depth G could be outside of this range. The panel 300c includes a lip 318c formed by folding the panel layers 302c,304c around an elongated rod 320c.

Turning to FIG. 12, the panel 300d is constructed in accordance with a sixth embodiment of the present invention and includes outer and inner panel layers 302d,304d bonded to each other by an adhesive layer 306d. The panel layers 302d,304d are formed so that the panel 300d includes an attachment region 308d and an alternative flap 310d. The flap 310d preferably includes a plurality of longitudinal corrugations 312d and presents an exposed surface 314d having grooves 316d.

Turning to FIG. 13, the panel 300e is constructed in accordance with a seventh embodiment of the present invention and includes outer and inner panel layers 302*e*,304*e* bonded to each other by an adhesive layer 306*e*.

The panel 300*e* includes an alternative attachment region 308*e* and an alternative flap 310*e*. The inner panel layer 304*e* has a first section 312*e* folded over the outer panel layer 302*e* and a second section 314*e* folded over the first section 312*e*. The flap 310*e* preferably also includes a plurality of longitudinal corrugations 316*e* and presents an exposed surface 318*e* having protrusions 320*e*.

Turning to FIG. 14, the panel 300*f* is constructed in accordance with an eighth embodiment of the present invention and includes outer and inner panel layers 302*f*,304*f* bonded to each other by an adhesive layer 306*f*. The panel 300*f* preferably includes an alternative attachment region 308*f* and an alternative shiftable flap 310*f*. The flap 310*f* includes an extension section 312*f*, a flap body 314*f*, and a lip 316*f*.

The flap body 314*f* includes a forward section 318*f*, a bend section 320*f* that defines a lowermost margin 322*f* of the flap 310*f*, and a rear section 324*f*. The rear section 324*f* is spaced behind the forward section 318*f* so that the sections 318*f*,320*f*,322*f* cooperatively define an insulating air gap 326*f*.

The panel layers 302*f*,304*f* are adhered to a backing strip 328*f*. The backing strip 328*f* preferably includes a material selected from the group consisting of wood, synthetic resin material, and a combination thereof. The alternative attachment region 308*f* is preferably configured so that the panel layers 302*f*,304*f* are unfolded and bonded to the backing strip 328*f* with an adhesive layer 330*f*.

Turning to FIG. 15, the panel 300*g* is constructed in accordance with a ninth embodiment of the present invention and includes outer and inner panel layers 302*g*,304*g* bonded to each other by an adhesive layer 306*g*. The panel 300*g* preferably includes an alternative attachment region 308*g* and an alternative shiftable flap 310*g*.

The attachment region 308*g* is formed by folding a first section 312*g* of the inner panel layer 304*g* behind a second section 314*g* of the inner panel layer 304*g* to form a hem margin. The sections 312*g*,314*g* are preferably spaced from each other.

The panel 300*g* also preferably includes a foam layer 316*g* bonded to the inner panel layer 304*g* of the flap 310*g* with a second adhesive layer 318*g*. The foam layer 316*g* presents a relief cutout 320*g*.

Turning to FIG. 16, the panel 300*h* is constructed in accordance with a tenth embodiment of the present invention and includes outer and inner panel layers 302*h*,304*h* bonded to each other by an adhesive layer 306*h*. The panel 300*h* preferably includes an alternative attachment region 308*h* and an alternative shiftable flap 310*h*. The panel 300*h* also preferably includes an alternative foam layer 312*h*.

The foam layer 312*h* presents a protrusion 314*h* that is bonded to the inner panel layer 304*h* of the flap 310*h* with a second adhesive layer 316*h*. Upper and lower regions 318*h*,320*h* of the foam layer 312*h* are spaced from the inner panel layer 304*h* to form air gaps 322*h*.

Turning to FIG. 17, the panel 300*i* is constructed in accordance with an eleventh embodiment of the present invention and includes outer and inner panel layers 302*i*, 304*i* bonded to each other by an adhesive filler section 306*i*. The panel layers 302*i*,304*i* are formed so that the panel 300*i* comprises a rigid, hollow structure that presents an elongated chamber 308*i*. The chamber 308*i* is then preferably filled with adhesive filler material.

The panel 300*i* includes an attachment region 310*i* and a flap 312*i*. The panel 300*i* presents a thickness dimension T that varies along the width of the panel 300*i*. Preferably, the thickness dimension T of the flap 312*i* tapers from a bend line 314*i* adjacent the attachment region 310*i* to a lowermost margin 316*i*.

Turning to FIG. 18, the panel 300*j* is constructed in accordance with a twelfth embodiment of the present invention and includes outer and inner panel layers 302*j*,304*j* bonded to each other by an adhesive layer 306*j*. The panel 300*j* includes an alternative attachment region 308*j* and an alternative flap 310*j*. The attachment region 308*j* is formed by folding a first section 312*j* of the inner panel layer 304*j* behind a second section 314*j* of the inner panel layer 304*j*. The first and second sections 312*j*,314*j* are spaced apart and extend generally parallel to one another. The sections 312*j*, 314*j* are interconnected by a third section 316*j* that is orthogonal to both sections 312*j*,314*j*. The attachment region 308*j* is preferably configured to be slidably mounted onto a wall (not shown) that includes blocks or bricks. For instance, the attachment region 308*j* could be slidably mounted onto a section of one of the concrete blocks shown in FIGS. 36-38.

The panel 300*j* also preferably includes an alternative foam layer 318*j* bonded to the inner panel layer of the flap 310*j* with a second adhesive layer 320*j*. The foam layer 318*j* includes a series of foam sections 322*j* that extend generally parallel to each other along the longitudinal axis. Each pair of adjacent foam sections 322*j* is preferably shiftable toward and away from one another as the panel 300*j* flexes. Also, each pair of adjacent foam sections 322*j* restricts the flap 310*j* of the panel 300*j* from flexing toward the enclosure wall when the covering temperature is lower than the normal operating temperature. Thus, in the illustrated embodiment, the foam sections 322*j* cooperatively restrict an exposed surface 324*j* from shifting to a convex shape.

Turning to FIG. 19, the panel 300*k* is constructed in accordance with a thirteenth embodiment of the present invention and includes outer and inner panel layers 302*k*, 304*k* bonded to each other by an adhesive layer 306*k*. The panel 300*k* includes an alternative attachment region 308*k* and an alternative flap 310*k*.

The panel 300*k* also preferably includes an alternative foam layer 312*k* similar to foam layer 318*j*. The alternative attachment region 308*k* preferably includes first, second, and third sections 314*k*,316*k*,318*k* similar to attachment region 318*j*. However, the third section 318*k* presents a longer width dimension than third section 316*j*. The attachment region 308*j* is preferably configured to be slidably mounted onto a wall (not shown) that includes blocks or bricks. For instance, the attachment region 308*j* could be slidably mounted onto a residential stone masonry brick.

Turning to FIG. 20, the panel 300*l* is constructed in accordance with a fourteenth embodiment of the present invention and includes outer and inner panel layers 302*l*, 304*l* bonded to each other by an adhesive layer 306*l*. The panel 300*l* includes an alternative attachment region 308*l* and an alternative flap 310*l*.

The panel 300*l* also preferably includes an alternative foam layer 312*l* similar to foam layer 312*k*. The alternative attachment region 308*l* is preferably formed by folding a first section 314*l* of the inner panel layer 304*l* behind a second section 316*l* of the inner panel layer 304*l*. The first and second sections 314*l*,316*l* are spaced apart and extend generally parallel to one another. The sections 314*l*,316*l* are interconnected by a bend 318*l*. The first section 314*l* extends downwardly behind the foam layer 312*k*. The first section 314*l* and the foam layer 312*l* cooperatively define an insulating air gap 320*l*.

Turning to FIG. 21, the panel 300m is constructed in accordance with a fifteenth embodiment of the present invention and includes outer and inner panel layers 302m, 304m bonded to each other by an adhesive layer 306m. The panel 300m includes an alternative attachment region 308m and an alternative flap 310m.

The panel 300m also preferably includes an alternative foam layer 312m similar to foam layers 312l,312k. The alternative attachment region 308m is formed by folding a first section 314m of the inner panel layer 304m behind a second section 316m of the inner panel layer 304m. The first section 314m and the foam layer 312m cooperatively define an insulating air gap 318m.

The panel 300m further includes multiple intermediate panel layers 320m spaced within the air gap 318m and bonded to corresponding backing strips 322m with adhesive layers 324m. The panel layers 320 preferably comprise a metallic material, such as aluminum to reflect radiant heat energy away from the corresponding wall.

Turning to FIG. 22, the panel 300n is constructed in accordance with a sixteenth embodiment of the present invention and includes outer and inner panel layers 302n, 304n bonded to each other by an adhesive layer 306n. The panel 300n includes an attachment region 308n and an alternative curved flap 310n. The flap 310n presents an exposed surface 312n that is generally convex at the normal operating temperature. The flap 310n is preferably shaped to resemble part of an outer log surface (e.g., to present features of a log cabin construction). However, the flap 310n also has a curved profile that can be used to represent the general shape of a spanish tile.

The panel 300n preferably includes an alternative foam layer 314n with a series of foam sections 316n that extend generally parallel to each other along the longitudinal axis of the panel 300n.

Turning to FIGS. 23-36, various alternative embodiments of panels 400a,400b,400c,400d,400e,400f,400g,400h,400i, 400j,400k,400l,400m with alternative end margins are illustrated. It will be appreciated that the end margin embodiments could be provided as a hem margin and/or a lip of any of the panel embodiments disclosed herein.

Each of the alternative panels 400a,400b,400c,400d,400e, 400f,400g,400h,400i, 400j,400k,400l,400m is formed at least partly by outer and inner panel layers 402,404 bonded to each other by an adhesive layer 406. The panels 400a, 400b,400c,400d,400e,400f,400g, 400h,400i,400j,400k,400l, 400m include corresponding end margins 408a,408b,408c, 408d,408e, 408f,408g,408h,408i,408j,408k,408l,408m. The panel layers 402,404 of end margin 408a are preferably unfolded to present exposed panel layer edges (see FIG. 23).

End margins 408b,408c,408d (see FIGS. 24-26) preferably include a clip element 410b,410c,410d that covers the corresponding edges of panel layers 402,404. End margins 408e,408g,408i,408m (see FIGS. 27, 29, 31, and 35) are formed by folding the corresponding outer and inner layers 402,404 onto one another to present corresponding fold configurations.

End margins 408f,408h,408j (see FIGS. 28, 30, and 32) are formed by folding the outer and inner layers 402,404 onto one another to present corresponding fold configurations. The panels 400f,400h,400j also include a corresponding bead 412f,412h,412j of adhesive material applied along the corresponding end margin 408f,408h,408j to cover a seam 414. End margins 408k,408l are formed by bending the outer and inner layers 402,404 around a rod 416 (see FIGS. 33 and 34).

Turning to FIGS. 36-38, an alternative wall covering 500 is constructed in accordance with a seventeenth embodiment of the present invention. The wall covering 500 is configured to be installed on a concrete block wall W of a building B. In the usual manner, the block wall W includes multiple rows of blocks K stacked and secured to one another with mortar joints M.

The wall covering 500 preferably includes alternative panels 502 and alternative fastening brackets 504. The fastening brackets 504 serve as fasteners to mount the panels 502 onto corresponding rows of blocks B.

Each bracket 504 comprises a unitary and elongated beam structure that includes tabs 506 that project into openings of the blocks B (see FIG. 37). Each bracket 504 also includes a channel section 508 (see FIG. 36) that presents a groove 510 (see FIG. 38) and a plurality of holes 512 (see FIG. 36). Each panel 502 includes outer and inner panel layers 514, 516 bonded by an adhesive layer 518 (see FIG. 38). The panel 502 also includes an attachment region 520 and a flap 522.

The attachment region 520 includes a finger 524 that is formed as part of the inner panel layer 516 and is sprung to project into a gap 526 defined between first and second sections 528,530 of the attachment region 520 (see FIG. 38). The first section 528 is configured to be slidably inserted into the groove 510 so that each finger 524 snaps into a corresponding one of the holes 512. The end of the finger 524 extends upwardly to engage the corresponding hole 512 and restricts removal of the panel 502 from the bracket 504.

Turning to FIGS. 39 and 40, an alternative wall covering 600 is constructed in accordance with an eighteenth embodiment of the present invention. The wall covering 600 preferably includes alternative panels 602 and fasteners 604.

Each panel 602 is generally similar to the panel 102 except that the panel 602 presents multiple transverse slots 606 that extend across the width of a flap 608. The slotted panel construction permits the panels 602 to be installed on a roof R of the enclosed building B as shingles. The panels 602 are mounted on the roof R with fasteners 604. The panels 602 are each configured to move in response to a change in covering temperature experienced by the panel 602. Each of the panels 602 preferably has length and width dimensions similar to conventional composite shingles.

Turning to FIG. 41, an alternative wall covering 700 is constructed in accordance with a nineteenth embodiment of the present invention. The wall covering 700 preferably includes alternative panels 702 and a web 704 of fastening material. The web 704 preferably includes a continuous sheet 706 of woven fabric material that is wound into a roll 708. The web 704 also preferably includes a series of adhesive strips 710 that are spaced along the fabric sheet 706.

The web 704 extends vertically along an enclosure wall W of a building B and is secured to the enclosure wall W with fasteners (not shown). With the web 704 mounted on the wall W, each panel 702 is configured to be mounted to a corresponding one of the adhesive strips 710.

Turning to FIGS. 51 and 52, a fire-resistant door 800 is constructed in accordance with a twentieth embodiment of the present invention. The door 800 is provided as part of a building B and preferably includes a door wall 802 and a door covering 804. The door wall 802 presents an upright door surface 806.

The door covering 804 includes a plurality of panels 808 that each include an attachment region 810, an upper flap 812, and a lower flap 814. The attachment region 810 extends laterally and is fixed to the door 800. For instance, where the door 800 comprises a steel door construction, the attachment regions 810 could be welded directly to the surface 806. However, the attachment regions 810 could be alternatively attached to the door body 802 (e.g., with threaded fasteners, adhesive, etc.).

The flaps 812,814 are shiftable into and out of an unflexed position at a normal operating temperature, where the flaps 812,814 extend vertically along the surface 806 and are generally parallel to and immediately adjacent the surface 806 (see FIG. 51). The flaps 812,814 are also shiftable into and out of a flexed position at a temperature above the normal operating temperature (see FIG. 52).

In the flexed position, the flaps 812,814 are generally spaced outwardly from the surface 806 so that the flaps 812,814 and surface 806 cooperatively define insulating air gaps 816. Thus, in the event that a space 820 facing the surface 806 includes elements that are being consumed by fire, the increased temperature due to the fire causes the flaps 812,814 to deploy into the flexed position.

If the building B has a ceiling-mounted, fire sprinkler system (not shown) to suppress a fire within the space 820, the upper flaps 812 are configured to collect water (not shown) along the surface 806. That is, with the upper flaps 812 deployed into the flexed position, the upper flaps 812 are configured to catch water from the sprinkler system and cooperate with the surface 806 to funnel and hold the water within the gaps 816. As a result, the door 800 collects water to cool the door 800 and to suppress fire from consuming the door 800.

Thermally Adaptive Enclosure Vent

Turning to FIGS. 42-50 and 53-56, various enclosure vent embodiments are illustrated. As will be shown, each of these vent embodiments includes a panel structure similar to panels shown in the previous embodiments.

Turning to FIGS. 42-46, a gable vent 900 is constructed in accordance with a twenty-first embodiment of the present invention. The gable vent 900 is illustrated as being mounted on a gable wall 902 of the enclosed building B. In the usual manner, the gable wall 902 defines part of an interior attic space 904 of the building B (see FIGS. 45 and 46). Similar to the previous panel embodiments, the gable vent 900 is configured to move in response to a change in temperature experienced by the gable vent 900 (which is referred to herein as the vent temperature). The gable vent 900 is preferably configured to permit air flow F to move into and out of the space 904.

The gable vent 900 preferably includes a vent frame 905, a vent cover 906, and laminated composite vent panels 908. The vent frame 904 is mounted to the gable wall 902 and cooperates with the gable wall 902 to define a vent opening 910. The vent opening 910 fluidly communicates with the interior attic space 904. The vent cover 906 is removably mounted to the vent frame 904 and presents an open chamber 912 and side openings 914 that fluidly communicate with the chamber 912.

Each vent panel 908 includes outer and inner panel layers 916,918 and an intermediate adhesive layer (not shown) that bonds the panel layers 916,918 relative to one another along an interface (not shown) defined between the panel layers 916,918. The outer and inner panel layers 916,918 have corresponding coefficients of thermal expansion that are different from each other and cause expansion and contraction of the corresponding panel layers 916,918 along the interface.

Each vent panel 908 defines an elongated attachment region 924 that is attached to the vent frame 904 and a flap 926 that includes a lowermost lip 928. Each vent panel 908 also preferably includes a foam layer 930 that is bonded to the inner panel layer 918 with another adhesive layer (not shown). The foam layer 930 preferably includes a series of foam sections 934 that extend generally parallel to each other along the longitudinal axis of the vent panel 908. Each pair of adjacent foam sections 934 is preferably shiftable toward and away from one another as the panel 908 flexes. Also, each pair of adjacent foam sections 934 restricts the flap 926 of the corresponding vent panel 908 from flexing toward the vent opening 910 from an unflexed position (see FIG. 45).

The gable vent 900 further includes elongated coil spring elements 936 that present opposite upper and lower ends 936a,b attached respectively to the attachment region 924 and the lip 928 (see FIGS. 43 and 44).

The flaps 926 are preferably shiftable into and out of the unflexed position. The flaps 926 are preferably in the unflexed position when the vent panel 908 is at a normal operating temperature. In the unflexed position, the flaps 926 extend vertically along the vent opening 910 and are generally parallel to and immediately adjacent the vent opening 910 (see FIGS. 43 and 45).

In the unflexed position, the spring elements 936 are preferably elongated from a relaxed condition so that the spring elements 936 are stretched. With the spring elements 936 stretched, the spring elements 936 preferably urge the flaps 926 to shift toward a flexed position (see FIGS. 44 and 46). In particular, the spring elements 936 apply generally upward spring forces to the lip 928 to urge the lip to move upwardly and away from the vent opening 910.

At the normal operating temperature, the structure of the vent panel 908 preferably exerts a force, which is partly due to the weight of the vent panel, that counteracts and is larger than the combined spring forces. Thus, at the normal operating temperature, the vent panel 908 remains in the unflexed position.

The flaps 926 are also shiftable into and out of the flexed position at a temperature above the normal operating temperature (see FIGS. 44 and 46). In the flexed position, the flaps 926 are generally spaced outwardly from the vent opening 910 so that air can pass into and out of the attic space 904.

In the flexed position, the spring elements 936 are preferably stretched to a smaller degree compared to the unflexed position. Furthermore, in some instances, the spring elements 936 could assume the relaxed condition when the flaps 926 are flexed.

Turning to FIGS. 47-50, a roof vent 1000 is constructed in accordance with a twenty-second embodiment of the present invention. The roof vent 1000 is illustrated as being mounted on a roof wall 1002 of the enclosed building B. In the usual manner, the roof wall 1002 defines part of an interior attic space 1004 of the building B (see FIGS. 49 and 50). Similar to the previous panel embodiments, the roof vent 1000 is configured to move in response to a change in temperature experienced by the roof vent 1000. The roof vent 1000 is preferably configured to permit air flow F to move into and out of the space 1004.

The roof vent 1000 preferably includes a vent frame 1006, a vent cover 1008, and a laminated composite vent panel 1010. The vent frame 1006 is mounted to the roof wall 1002 and cooperates with the roof wall 1002 to define a vent opening 1012 (see FIGS. 49 and 50). The vent opening 1012 fluidly communicates with the interior attic space 1002. The vent frame 1006 presents an open chamber 1014 and side openings 1016 that fluidly communicate with the chamber 1014.

The vent panel 1010 is similar to the vent panel 908 and includes outer and inner panel layers 1018,1020 and an intermediate adhesive layer (not shown) that bonds the panel layers 1018,1020 relative to one another. The vent panel 1010 also preferably includes a foam layer 1024 (see FIGS. 49 and 50) that is bonded to the inner panel layer 1020 with another adhesive layer 1026. The foam layer 1024 preferably includes a series of foam sections 1028 (see FIGS. 49 and 50) that extend generally parallel to each other along the longitudinal axis of the vent panel 1010.

Each vent panel 1010 defines an elongated attachment region 1030 that is attached to the vent frame 1006 and a flap 1032. The flap 1032 is shiftable into and out of the unflexed position at a normal operating temperature where the flap 1032 is in abutting engagement with the frame 1006 to extend generally parallel to the vent opening 1012 (see FIGS. 47 and 49).

The flap 1032 is also shiftable into and out of the flexed position at a temperature above the normal operating temperature (see FIGS. 48 and 50). In the flexed position, the flap 1032 is generally spaced outwardly from the frame 1006 and the vent opening 1012 so that air flow F can pass into and out of the attic space 1004.

Turning to FIGS. 53 and 54, a roof vent 1100 is constructed in accordance with a twenty-third embodiment of the present invention. The roof vent 1100 is illustrated as being mounted on the roof wall 1102 of the enclosed building B. The roof wall 1102 presents a roof opening 1104 and defines part of an interior space 1105. Similar to the previous panel embodiments, the roof vent 1100 is configured to move in response to a change in temperature experienced by the roof vent 1100. The roof vent 1100 is preferably configured to permit air flow F to move into and out of the space 1105.

The roof vent 1100 preferably includes a laminated composite vent panel 1106 and a vent plug 1108. The vent panel 1106 includes outer and inner panel layers 1110,1112 and an intermediate adhesive layer 1114. The vent panel 1106 also includes a foam layer 1118 bonded to the inner panel layer 1112 with another adhesive layer 1120.

The vent panel 1106 defines an attachment region 1122 and a flap 1124. The attachment region 1122 is secured to the wall 1102 with threaded fasteners 1126. The flap 1124 is shiftable into and out of the unflexed position at a normal operating temperature where the flap 1124 extends generally parallel to and engages a surface 1128 of the roof wall 1102 (see FIG. 53). Also, the vent plug 1108 is preferably removably received by the opening 1104.

The flap 1124 is also shiftable into and out of the flexed position at a temperature above the normal operating temperature (see FIG. 54). In the flexed position, the flap 1124 is generally spaced outwardly from the roof opening 1104 so that air flow F can pass into and out of the attic space 1105.

Turning to FIGS. 55 and 56, an automobile roof vent 1200 is constructed in accordance with a twenty-fourth embodiment of the present invention. The roof vent 1200 is illustrated as being mounted on the roof wall 1202 of a vehicle V. The illustrated vehicle V comprises an automobile with a rolling chassis and a drive train (not shown).

In the usual manner, the roof wall 1202 defines part of an interior vehicle space 1204 of the vehicle V. The roof vent 1200 is configured to move in response to a change in temperature experienced by the roof vent 1200. The roof vent 1200 is preferably configured to permit air flow F to move into and out of the space 1204 (e.g., as the vehicle V is being advanced in a forward travel direction N.

The roof vent 1200 preferably includes a vent frame 1206 and a series of laminated composite vent panels 1208. The vent frame 1206 is mounted to the roof wall 1202 and defines a vent opening 1210. Each vent panel 1208 includes an outer panel layer 1212, an inner panel layer (not shown), and an intermediate adhesive layer (not shown) bonding the panel layers to each other.

Each vent panel 1208 defines an attachment region 1218 fixed to the roof wall 1202 and a flap 1220 (see FIG. 55). The flap 1220 is shiftable into and out of the unflexed position at a normal operating temperature where the flap 1220 extends generally parallel to and engages a surface 1222 of the roof wall 1202 (see FIG. 55).

The flap 1220 is also shiftable into and out of the flexed position at a temperature above the normal operating temperature (see FIG. 56). In the flexed position, the flap 1220 is generally spaced outwardly from the vent opening 1210 so that air flow F can pass into and out of the interior vehicle space 1204.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. An exterior thermally adaptive wall covering operable to cover at least part of a wall and to move in response to a change in covering temperature, said wall covering comprising:

a laminated composite panel including first and second panel layers and an intermediate adhesive layer that connects the panel layers relative to one another, said panel layers overlying one another to present opposed interior panel surfaces, with the adhesive layer located between the interior panel surfaces and defined along an interface therebetween, said panel defining an elongated attachment region along which the panel is configured to be attached to the wall, said first panel layer generally overlying the second panel layer when the attachment region is attached to the wall, with the second panel layer configured to generally face the wall, said first and second panel layers having, respectively, first and second coefficients of thermal expansion that are different from each other and cause expansion and contraction of the corresponding panel layers along the interface, said adhesive layer permitting expansion and/or contraction of each panel layer relative to the other panel layer along the interface in response to the covering temperature change so that the panel flexes along a flexing direction transverse to the interface, said second coefficient of thermal expansion of the second panel layer being greater than the first coefficient of thermal expansion of the first panel layer, with part of the panel spaced from the attachment region configured to shift away from the wall in response to an increasing covering temperature and configured to flex toward the wall in response to a decreasing covering temperature, said part of the panel presenting an outwardly facing exposed surface when the attachment region is attached to the wall, said part of the panel flexing so that the exposed surface is concave when the covering temperature is higher than a predetermined operating temperature, said part of the panel flexing so that the exposed surface is convex when the covering temperature is lower than the predetermined operating temperature.

2. The exterior thermally adaptive wall covering as claimed in claim 1, said panel presenting a longitudinal axis, said layers being configured so that expansion and contraction of each panel layer occurs substantially along a direction generally orthogonal to the longitudinal axis, with the panel flexing about the longitudinal axis.

3. The exterior thermally adaptive wall covering as claimed in claim 2, said adhesive layer bonding the panel layers relative to one another, said panel including a foam layer and another intermediate adhesive layer bonding the second panel layer and the foam layer to one another, said second panel layer covering the foam layer when the attachment region is attached to the wall.

4. The exterior thermally adaptive wall covering as claimed in claim 3, said foam layer including a series of foam sections that extend generally parallel to each other along the longitudinal axis, with each pair of adjacent foam sections being shiftable toward and away from one another as the panel flexes.

5. The exterior thermally adaptive wall covering as claimed in claim 4, each of said pairs of adjacent foam sections being in abutting engagement with one another when the covering temperature is at the predetermined operating temperature, said pairs of adjacent foam sections restricting said part of the panel from flexing when the covering temperature is lower than the predetermined operating temperature, with the exposed surface being restricted from shifting to a convex shape.

6. The exterior thermally adaptive wall covering as claimed in claim 1, said first panel layer comprising a material selected from the group consisting of graphite, epoxy resin, graphene, Invar, and combinations thereof.

7. The exterior thermally adaptive wall covering as claimed in claim 6, said second panel layer comprising a material selected from the group consisting of aluminum, copper, magnesium, vinyl, stainless steel, and combinations thereof.

8. The exterior thermally adaptive wall covering as claimed in claim 7, said adhesive layer including an adhesive material selected from the group consisting of epoxy resin, elastomeric resin, silicone, and combinations thereof.

9. The exterior thermally adaptive wall covering as claimed in claim 1, said panel including a damping material configured to dampen relative movement between the panel layers.

10. The exterior thermally adaptive wall covering as claimed in claim 9, said adhesive layer bonding the panel layers relative to one another.

11. The exterior thermally adaptive wall covering as claimed in claim 10, said adhesive layer comprising the damping material and including an adhesive material selected from the group consisting of epoxy resin, elastomeric resin, silicone, and combinations thereof.

12. The exterior thermally adaptive wall covering as claimed in claim 10, said panel including a damping layer that includes the damping material and is positioned between the panel layers to dampen relative movement between the panel layers, said damping layer being adhered to at least one of the panel layers by the adhesive layer.

13. The exterior thermally adaptive wall covering as claimed in claim 1, said first coefficient of thermal expansion ranging from about negative five (−5) microstrain per degree Celsius to about five (5) microstrain per degree Celsius.

14. The exterior thermally adaptive wall covering as claimed in claim 1, said second coefficient of thermal expansion ranging from about ten (10) microstrain per degree Celsius to about one thousand (1000) microstrain per degree Celsius.

15. The exterior thermally adaptive wall covering as claimed in claim 1, said panel including a coating layer applied to and covering the first panel layer, with the coating layer being exposed when the attachment region is attached to the wall.

16. The exterior thermally adaptive wall covering as claimed in claim 15, said coating layer comprising a material selected from the group of enamel paint, latex paint, powder-coated paint, and combinations thereof.

17. The exterior thermally adaptive wall covering as claimed in claim 1, said panel presenting a longitudinal axis, said layers being configured so that expansion and contraction of each panel layer occurs substantially along a direction generally orthogonal to the longitudinal axis, with the panel flexing about the longitudinal axis.

18. The exterior thermally adaptive wall covering as claimed in claim 17, said attachment region being formed by folding at least one of the panel layers onto itself so that the attachment region defines a hem margin that extends along the axis, with a remainder of the panel being cantilevered from the hem margin when the hem margin is attached to the wall.

19. The exterior thermally adaptive wall covering as claimed in claim 18,
said first and second panel layers being folded onto themselves to define the hem margin.

20. The exterior thermally adaptive wall covering as claimed in claim 18,
said panel presenting another margin opposite the hem margin, with the another margin being formed by folding at least one of the panel layers onto itself.

21. The exterior thermally adaptive wall covering as claimed in claim 20,
said first and second panel layers being folded onto themselves to define the another margin.

22. The exterior thermally adaptive wall covering as claimed in claim 1; and
multiple ones of said laminated composite panel,
said multiple panels including a first panel and a second panel secured relative to the first panel so as to overlap the first panel,
said second coefficient of thermal expansion of the second panel layer being greater than the first coefficient of thermal expansion of the first panel layer, with part of the second panel being spaced from the corresponding attachment region and configured to shift away from the first panel in response to an increasing covering temperature and configured to shift toward the first panel in response to a decreasing covering temperature.

23. The exterior thermally adaptive wall covering as claimed in claim 22,
said second panel being shiftable between an unsealed condition, where said part of the second panel is spaced from the first panel to define an opening therebetween, and a sealed condition, where said part of the second panel engages the first panel to close the opening.

24. The exterior thermally adaptive wall covering as claimed in claim 23,
said part of the second panel presenting an outwardly facing exposed surface,
said exposed surface being generally planar in the unsealed condition when the covering temperature is at a predetermined operating temperature.

25. The exterior thermally adaptive wall covering as claimed in claim 24,
said part of the second panel flexing in the unsealed condition so that the exposed surface is concave when the covering temperature is higher than the predetermined operating temperature, with the second panel being spaced from the first panel.

26. The exterior thermally adaptive wall covering as claimed in claim 1,
said adhesive layer being bonded directly to the interior panel surfaces.

27. The exterior thermally adaptive wall covering as claimed in claim 26,
said panel layers being continuous and generally coextensive with one another.

28. The exterior thermally adaptive wall covering as claimed in claim 26,
said first and second panel layers having, respectively, a first modulus of elasticity and a second modulus of elasticity,
said adhesive layer having an adhesive modulus of elasticity that is less than the first modulus of elasticity and the second modulus of elasticity so that the adhesive layer permits expansion and/or contraction of each panel layer along the interface in response to the covering temperature change and corresponding flexing of the panel along the flexing direction.

29. An exterior thermally adaptive wall covering operable to cover at least part of a wall and to move in response to a change in covering temperature, said wall covering comprising:
a laminated composite panel including first and second panel layers and an intermediate adhesive layer that connects the panel layers relative to one another,
said panel layers overlying one another to present opposed interior panel surfaces, with the adhesive layer located between the interior panel surfaces and defined along an interface therebetween,
said panel defining an elongated attachment region along which the panel is configured to be attached to the wall,
said first panel layer generally overlying the second panel layer when the attachment region is attached to the wall, with the second panel layer configured to generally face the wall,
said first and second panel layers having, respectively, first and second coefficients of thermal expansion that are different from each other and cause expansion and contraction of the corresponding panel layers along the interface,
said adhesive layer permitting expansion and/or contraction of each panel layer relative to the other panel layer along the interface in response to the covering temperature change so that the panel flexes along a flexing direction transverse to the interface,
said panel presenting a longitudinal axis,
said layers being configured so that expansion and contraction of each panel layer occurs substantially along a direction generally orthogonal to the longitudinal axis, with the panel flexing about the longitudinal axis,
said attachment region being formed by folding at least one of the panel layers onto itself so that the attachment region defines a hem margin that extends along the axis, with a remainder of the panel being cantilevered from the hem margin when the hem margin is attached to the wall,
said first panel layer generally covering the second panel layer when the attachment region is attached to the wall,
said second coefficient of thermal expansion of the second panel layer being greater than the first coefficient of thermal expansion of the first panel layer, with the remainder of the panel configured to flex away from the wall in response to an increasing covering temperature and configured to flex toward the wall in response to a decreasing covering temperature,
said remainder of the panel presenting an outwardly facing exposed surface when the attachment region is attached to the wall,
said exposed surface being generally planar when the covering temperature is at a predetermined operating temperature,
said exposed surface being concave when the covering temperature is higher than the predetermined operating temperature,
said exposed surface being convex when the covering temperature is lower than the predetermined operating temperature.

30. An exterior thermally adaptive wall covering operable to cover at least part of a wall and to move in response to a change in covering temperature, said wall covering comprising:

a laminated composite panel including first and second panel layers and an intermediate adhesive layer that connects the panel layers relative to one another, said panel layers overlying one another to present opposed interior panel surfaces, with the adhesive layer located between the interior panel surfaces and defined along an interface therebetween, said panel defining an elongated attachment region along which the panel is configured to be attached to the wall, said first panel layer generally overlying the second panel layer when the attachment region is attached to the wall, with the second panel layer configured to generally face the wall, said first and second panel layers having, respectively, first and second coefficients of thermal expansion that are different from each other and cause expansion and contraction of the corresponding panel layers along the interface, said adhesive layer permitting expansion and/or contraction of each panel layer relative to the other panel layer along the interface in response to the covering temperature change so that the panel flexes along a flexing direction transverse to the interface, multiple ones of said laminated composite panel, said multiple panels including a first panel and a second panel secured relative to the first panel so as to overlap the first panel, said second coefficient of thermal expansion of the second panel layer being greater than the first coefficient of thermal expansion of the first panel layer, with part of the second panel being spaced from the corresponding attachment region and configured to shift away from the first panel in response to an increasing covering temperature and configured to shift toward the first panel in response to a decreasing covering temperature, said second panel being shiftable between an unsealed condition, where said part of the second panel is spaced from the first panel to define an opening therebetween, and a sealed condition, where said part of the second panel engages the first panel to close the opening, said part of the second panel presenting an outwardly facing exposed surface, said exposed surface being generally planar in the unsealed condition when the covering temperature is at a predetermined operating temperature, said part of the second panel flexing in the unsealed condition so that the exposed surface is concave when the covering temperature is higher than the predetermined operating temperature, with the second panel being spaced from the first panel, said part of the second panel flexing in the sealed condition so that the exposed surface is convex.

31. The exterior thermally adaptive wall covering as claimed in claim 30, said second panel flexing into the sealed condition when the covering temperature reaches a sealing temperature below the predetermined operating temperature.

* * * * *